(12) United States Patent
Ishimaru

(10) Patent No.: US 11,047,814 B2
(45) Date of Patent: Jun. 29, 2021

(54) X-RAY FLUORESCENCE ANALYSIS MEASUREMENT METHOD AND X-RAY FLUORESCENCE ANALYSIS MEASUREMENT DEVICE

(71) Applicant: C. UYEMURA & CO., LTD, Osaka (JP)

(72) Inventor: Shinji Ishimaru, Osaka (JP)

(73) Assignee: C. Uyemura & Co., Ltd., Osaka (JP)

( * ) Notice: Subject to any disclaimer, the term of this patent is extended or adjusted under 35 U.S.C. 154(b) by 0 days.

(21) Appl. No.: 16/636,314

(22) PCT Filed: Jul. 5, 2018

(86) PCT No.: PCT/JP2018/025552
§ 371 (c)(1),
(2) Date: Feb. 3, 2020

(87) PCT Pub. No.: WO2019/031125
PCT Pub. Date: Feb. 14, 2019

(65) Prior Publication Data
US 2021/0164925 A1    Jun. 3, 2021

(30) Foreign Application Priority Data
Aug. 7, 2017    (JP) .............................. JP2017-152517

(51) Int. Cl.
G01N 23/223    (2006.01)

(52) U.S. Cl.
CPC ..... *G01N 23/223* (2013.01); *G01N 2223/076* (2013.01)

(58) Field of Classification Search
CPC ................ G01N 23/223; G01N 2223/076
See application file for complete search history.

(56) References Cited

U.S. PATENT DOCUMENTS

| | | |
|---|---|---|
| 4,577,338 A | 3/1986 | Takamashi et al. |
| 5,272,745 A * | 12/1993 | Smallbone ........... G01N 23/223 250/255 |

(Continued)

FOREIGN PATENT DOCUMENTS

| | | |
|---|---|---|
| JP | 57179732 A | 11/1982 |
| JP | 585639 A | 1/1983 |

(Continued)

OTHER PUBLICATIONS

Fujino, Nobukatsu et al., "On-Line Analyzer for the Concentration of Ni—Zn Alloy Plating Bath", pp. 1510-1517, The Iron and Steel Institute of Japan (ISIJ), Sep. 1, 1983, vol. 69, No. 11.

(Continued)

*Primary Examiner* — Chih-Cheng Kao
(74) *Attorney, Agent, or Firm* — Haverstock & Owens LLP

(57) ABSTRACT

The purpose of the present invention is to provide a measurement method and a measurement device capable of accurately measuring various metal concentrations of metals included in a solution to be measured containing a plurality of additives and metals. An X-ray fluorescence analysis measurement method for measuring various metal concentrations of metals to be measured included in a solution to be measured containing one or more types of additives and metals based on measured values of X-ray fluorescence intensity, comprising: a calibration curve polynomial determination step S11 for determining polynomial approximations of calibration curves for the metals to be measured; a solution type correction polynomial determination step S12 for determining polynomial approximations for correcting error in the measured values of X-ray fluorescence intensity of the metals to be measured resulting from containing additives; a specific gravity correction polynomial determination step S13 for determining polynomial approximations for correcting error in the measured values of X-ray fluorescence intensity of the metals to be measured resulting from differences in specific gravity of the solution to be measured; and a metal concentration measurement step S14 for measuring various metal concentrations of the metals to be measured by using the polynomial approximations determined in the calibration curve polynomial determination step, the solution type correction polynomial determination step, and the specific gravity correction polynomial determination step.

9 Claims, 8 Drawing Sheets

(56) References Cited

U.S. PATENT DOCUMENTS

| | | | |
|---|---|---|---|
| 2005/0011187 A1* | 1/2005 | Cook .................. | C10L 10/02 60/311 |
| 2011/0103547 A1* | 5/2011 | Ohzawa ............... | G01N 23/223 378/45 |
| 2016/0123910 A1* | 5/2016 | Lee .................... | G01N 23/223 378/48 |

FOREIGN PATENT DOCUMENTS

| JP | 60164239 A | 8/1985 |
|---|---|---|
| JP | 332735 B2 | 5/1991 |
| JP | 3221852 A | 9/1991 |
| JP | 2011-75542 A | 4/2011 |
| JP | 2013-137273 A | 7/2013 |

OTHER PUBLICATIONS

The International Search Report for the PCT application PCT/JP2018/025552 dated Sep. 18, 2018.

* cited by examiner

US 11,047,814 B2

X-RAY FLUORESCENCE ANALYSIS MEASUREMENT METHOD AND X-RAY FLUORESCENCE ANALYSIS MEASUREMENT DEVICE

BACKGROUND OF THE INVENTION

Field of the Invention

The present invention relates to a measurement method for measuring various metal concentrations of metals to be measured included in a solution to be measured containing a plurality of additives and metals by X-ray fluorescence analysis, and to a measurement device for measuring various metal concentrations by X-ray fluorescence analysis. The present application claims priority based on Japanese Patent Application No. 2017-152517 filed in Japan on Aug. 7, 2017, which is incorporated by reference herein.

Description of Related Art

X-ray fluorescence analysis is used for measuring concentrations of various metals contained in a solution to be measured such as a plating solution used in an electronics field. The solution to be measured mostly contains not only metal components but also a plurality of additive components. When measuring concentrations of various metals contained in such solution to be measured, X-ray fluorescence intensity of components to be measured will be influenced by attenuation of X-ray by additives or the like, which will not be measured.

Therefore, in order to measure various metal concentrations, correction of intensity of X-ray intensity according to characteristics of X-ray using calibration curves will be necessary.

For example, in Patent Literature 1, constants of simultaneous equations representing a relation between concentrations of various metals contained in a plating solution and X-ray fluorescence intensity of each component are found as a result of measurement of X-ray fluorescence intensity about a reference sample in which concentration of each component is known, and thereby, various metal concentrations are found.

Patent Literature 1: JP H3-32735 A

SUMMARY OF THE INVENTION

However, by the above method, it is not possible to measure various metal concentrations accurately, even if a substance to be measured is same, when mixing ratio or types of components of additives contained in a solution differs per solution type, or when concentrations of various metals or additives are changed.

Here, the purpose of the present invention is to provide a measurement device and a measurement method for accurately measuring various metal concentrations included in a solution to be measured containing a plurality of additives and metals.

A measurement method relating to one embodiment of the present invention is an X-ray fluorescence analysis measurement method for measuring various metal concentrations of metals to be measured included in a solution to be measured containing one or more types of additives and metals based on measured values of X-ray fluorescence intensity, comprising: a calibration curve polynomial determination step for determining polynomial approximations of calibration curves for the metals to be measured; a solution type correction polynomial determination step for determining polynomial approximations for correcting error in the measured values of X-ray fluorescence intensity of the metals to be measured resulting from containing additives; a specific gravity correction polynomial determination step for determining polynomial approximations for correcting error in the measured values of X-ray fluorescence intensity of the metals to be measured resulting from differences in specific gravity of the solution to be measured; and a metal concentration measurement step for measuring various metal concentrations of the metals to be measured by using the polynomial approximations determined in the calibration curve polynomial determination step, the solution type correction polynomial determination step, and the specific gravity correction polynomial determination step.

In this way, it is possible to accurately measure various metal concentrations of metals included in a solution to be measured containing a plurality of additives and metals.

At this time, in one embodiment of the present invention, the calibration curve polynomial determination step may comprise: preparing three or more types of calibration curve reference solutions, which only contain the metals to be measured and not contain the additives, and in which concentrations of the metals to be measured are changed, and measuring X-ray fluorescence intensity of the calibration curve reference solutions respectively to determine calibration curve intensity $A1, A2 \ldots, An$; plotting three or more points on a graph by indicating concentrations of the metals to be measured of the calibration curve reference solutions as values of a vertical axis and by indicating the calibration curve intensity $A1, A2 \ldots, An$ as values of a horizontal axis; and calculating polynomial approximations from the graph to determine calibration curve polynomial. (Wherein, n is an integer of 3 or more.)

In this way, it is possible to accurately measure various metal concentrations of metals included in a solution to be measured containing a plurality of additives and metals.

At this time, in one embodiment of the present invention, the solution type correction polynomial determination step may comprise: preparing three or more types of solution type correction reference solutions, in which the additives with same concentration as concentration of the additives contained in the solution to be measured at use are added to the calibration curve reference solutions respectively, and measuring X-ray fluorescence intensity of the solution type correction reference solutions respectively to determine solution type correction intensity $B1, B2 \ldots, Bn$; plotting three or more points on a graph by indicating solution type correction coefficient $C1, C2 \ldots, Cn$, which is a value represented by a formula $A1/B1, A2/B2 \ldots, An/Bn$, as a value of a vertical axis and by indicating the solution type correction intensity $B1, B2 \ldots, Bn$ as a horizontal axis; and calculating polynomial approximations from the graph to determine solution type correction polynomial. (Wherein, n is an integer of 3 or more.)

In this way, it is possible to accurately measure various metal concentrations of metals included in a solution to be measured containing a plurality of additives and metals, as accurate correction of intensity will be possible in all ranges of concentration.

In addition, in one embodiment of the present invention, the specific gravity correction polynomial determination step may comprise: preparing three or more types of specific gravity correction reference solutions, in which concentrations of the metals to be measured are set to concentrations of the metals included in the solution to be measured at use, and in which concentration of the additives is changed, and measuring X-ray fluorescence intensity of the specific gravity correction reference solutions respectively to determine first specific gravity correction intensity D1, D2 . . . , Dm, and measuring specific gravity of the specific gravity correction reference solutions respectively to determine reference specific gravity E1, E2 . . . , Em; substituting the first specific gravity correction intensity D1, D2 . . . , Dm into the solution type correction polynomial to obtain the solution type correction coefficient, and multiplying the solution type correction coefficient with the first specific gravity correction intensity D1, D2, . . . , Dm respectively to determine second specific gravity correction intensity F1, F2 . . . , Fm; measuring X-ray fluorescence intensity of the specific gravity correction reference solutions, among which concentration of the additives is same as concentration of the additives contained in the solution to be measured at use, to determine third specific gravity correction intensity Dp; substituting the third specific gravity correction intensity Dp into the solution type correction polynomial to obtain the solution type correction coefficient, and multiplying the solution type correction coefficient with the third specific gravity correction intensity Dp to determine fourth specific gravity correction intensity Gp; calculating a value represented by a formula Gp/F1, Gp/F2, . . . , Gp/Fm to determine specific gravity correction coefficient H1, H2 . . . , Hm; plotting three or more points on a graph by indicating the specific gravity correction coefficient H1, H2 . . . , Hm as values of a vertical axis and by indicating the reference specific gravity E1, E2 . . . , Em as values of a horizontal axis, and calculating polynomial approximations from the graph to determine specific gravity correction polynomial. (Wherein, m is an integer of 3 or more.)

In this way, it is possible to accurately measure various metal concentrations of metals included in a solution to be measured containing a plurality of additives and metals, as more accurate measurement of various solutions to be measured, in which specific gravity changes as concentration of the additives differs, will be possible.

In addition, in one embodiment of the present invention, the metal concentration measurement step may comprise: an X-ray fluorescence intensity measurement step for measuring X-ray fluorescence intensity of the solution to be measured to determine first measured intensity; a specific gravity measurement step for measuring specific gravity of the solution to be measured to determine measured specific gravity; and a metal concentration calculation step for calculating concentrations of the metals to be measured using the X-ray fluorescence intensity, the specific gravity, the calibration curve polynomial, the solution type correction polynomial and the specific gravity correction polynomial, wherein, in the metal concentration calculation step, the first measured intensity is substituted into the solution type correction polynomial to obtain the solution type correction coefficient and the solution type correction coefficient is multiplied by the first measured intensity to determine second measured intensity, the measured specific gravity is substituted into the specific gravity correction polynomial to obtain the specific gravity correction coefficient and the specific gravity correction coefficient is multiplied by the second measured intensity to determine third measured intensity, the third measured intensity is substituted into the calibration curve polynomial to calculate concentrations of the metals to be measured, which will be a measurement result of concentrations of the metals to be measured of the solution to be measured.

In this way, it is possible to accurately measure various metal concentrations of metals included in a solution to be measured containing a plurality of additives and metals.

In addition, in one embodiment of the present invention, it may further comprise a dilution step for obtaining diluted solution to be measured by diluting the solution to be measured before the calibration curve polynomial determination step, wherein at least the solution type correction polynomial determination step is performed using the diluted solution to be measured.

In this way, it is possible to accurately measure various metal concentrations of metals included in a solution to be measured, as calculations by polynomial approximations will be facilitated.

In addition, in one embodiment of the present invention, it is an X-ray fluorescence analysis measurement method for measuring various metal concentrations of metals to be measured included in a solution to be measured containing one or more types of additives and metals based on measured values of X-ray fluorescence intensity, comprising: a dilution step for obtaining diluted solution to be measured by diluting the solution to be measured; a calibration curve polynomial determination step for determining polynomial approximations of calibration curves for the metals to be measured; a solution type correction coefficient determination step for determining correction coefficient for correcting error in the measured values of X-ray fluorescence intensity of the metals to be measured resulting from containing additives; a metal concentration measurement step for measuring various metal concentrations of the metals to be measured by using the polynomial approximations determined in the calibration curve polynomial determination step and the correction coefficient determined in the solution type correction coefficient determination step, wherein, in the dilution step, concentrations of the metals to be measured are diluted to be in a range of 10 to 200 ppm.

In this way, it is possible to accurately measure various metal concentrations of metals included in a solution to be measured easily, as calculations of correction will be facilitated as it will be fixed correction coefficient with one point and solution type correction coefficient will not be calculated by polynomial approximations, and as specific gravity correction will be unnecessary.

In addition, in one embodiment of the present invention, it is an X-ray fluorescence analysis measurement device for measuring various metal concentrations of metals to be measured included in a solution to be measured containing one or more types of additives and metals based on measured values of X-ray fluorescence intensity, comprising: an X-ray fluorescence intensity measurement means for measuring the measured values of X-ray fluorescence intensity; a specific gravity measurement means for measuring measured values of specific gravity of the solution to be measured; a storage means; and a calculation means, wherein the storage means stores a group of polynomials including: calibration curve polynomial which is polynomial approximations of calibration curves of the metals to be measured; solution type correction polynomial which is polynomial approximations for correcting error in the measured values of X-ray fluorescence intensity of the metals to be measured resulting from containing additives; and specific gravity correction polynomial which is polynomial approximations for correcting error in the measured values of X-ray fluorescence intensity of the metals to be measured resulting from differences in specific gravity of the solution to be measured, the calculation means calculates the various metal concentrations using the measured values of X-ray fluorescence intensity, the measured values of specific gravity and the group of polynomials.

In this way, it is possible to accurately measure various metal concentrations of metals included in a solution to be measured containing a plurality of additives and metals.

In addition, in one embodiment of the present invention, it is an X-ray fluorescence analysis measurement device for measuring various metal concentrations of metals to be measured included in a solution to be measured containing one or more types of additives and metals based on measured values of X-ray fluorescence intensity, comprising: a dilution means for diluting the solution to be measured; an X-ray fluorescence intensity measurement means for measuring the measured values of X-ray fluorescence intensity; a storage means; and a calculation means, wherein the storage means stores: a dilution formula for diluting concentrations of metals included in the solution to be measured to be in a range of 10 to 200 ppm; calibration curve polynomial which is polynomial approximations of calibration curves of the metals to be measured; and correction coefficient for correcting error in the measured values of X-ray fluorescence intensity of the metals to be measured resulting from containing additives, the calculation means calculates the various metal concentrations using the measured values of X-ray fluorescence intensity and the correction coefficient.

In this way, it is possible to accurately measure various metal concentrations of metals included in a solution to be measured easily, as calculations of correction will be facilitated as it will be fixed correction coefficient with one point and solution type correction coefficient will not be calculated by polynomial approximations, and as specific gravity correction will be unnecessary.

As explained in the above, according to the present invention, it is possible to accurately measure various metal concentrations, even when mixing ratio or types of components of additives contained in a solution differs per solution type, or even when concentrations of various metals or additives are changed.

DETAILED DESCRIPTION OF THE INVENTION

Hereinafter, explaining in detail about preferred embodiments of the present invention, with reference to the drawings. In addition, the embodiments explained in below will not unjustly limit the content of the present invention described in claims, and it is not limited that all the structures explained in the embodiments are necessary as means for solving the problem of the present invention.

Figure 1:
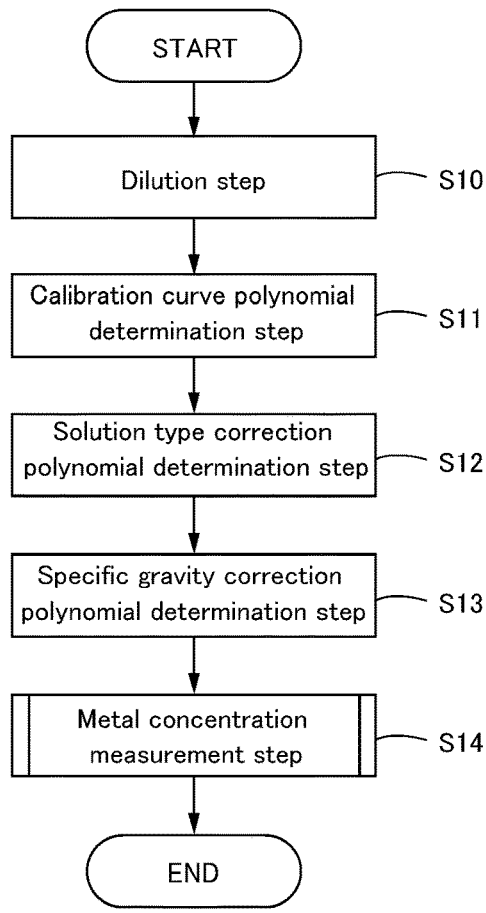
FIG. 1 is a flow chart illustrating an outline of an X-ray fluorescence analysis measurement method relating to one embodiment of the present invention.

1. Measurement method of various metal concentrations
   1-1. Calibration curve polynomial determination step
   1-2. Solution type correction polynomial determination step
   1-3. Specific gravity correction polynomial determination step
   1-4. Metal concentration measurement step
   1-5. Dilution step
2. Measurement method of various metal concentrations relating to another embodiment
3. Measurement device of various metal concentrations
   3-1. Sampling means
   3-2. X-ray fluorescence intensity measurement means
   3-3. Specific gravity measurement means
   3-4. Storage means
   3-5. Calculation means
   3-6. Dilution means
4. Measurement device of various metal concentrations relating to another embodiment 1. Measurement Method of Various Metal Concentrations FIG. 1 is a flow chart illustrating an outline of a measurement method of various metal concentrations relating to one embodiment of the present invention. A measurement method of various metal concentrations relating to one embodiment of the present invention is an X-ray fluorescence analysis measurement method for measuring various metal concentrations of metals to be measured included in a solution to be measured containing one or more types of additives and metals based on measured values of X-ray fluorescence intensity. And, as illustrated in FIG. 1, the measurement method of various metal concentrations relating to one embodiment of the present invention comprises a calibration curve polynomial determination step S11, a solution type correction polynomial determination step S12, a specific gravity correction polynomial determination step S13, and a metal concentration measurement step S14.

The calibration curve polynomial determination step S11 determines polynomial approximations of calibration curves of the metals to be measured. In addition, the solution type correction polynomial determination step S12 determines polynomial approximations for correcting error in the measured values of X-ray fluorescence intensity of the metals to be measured resulting from containing additives. In addition, the specific gravity correction polynomial determination step S13 determines polynomial approximations for correcting error in the measured values of X-ray fluorescence intensity of the metals to be measured resulting from differences in specific gravity of the solution to be measured. In addition, the metal concentration measurement step S14 measures various metal concentrations of the metals to be measured by using the polynomial approximations determined in the calibration curve polynomial determination step S11, the solution type correction polynomial determination step S12, and the specific gravity correction polynomial determination step S13.

Here, a solution to be measured used in the measurement method of various metal concentrations relating to one embodiment of the present invention is a solution to be measured, in which X-ray fluorescence analysis of various meatal concentrations of the metals to be measured included in the solution to be measured containing a plurality of additives and metals will be necessary, which are a processing solution for plating such as a plating solution or a plating pretreatment solution, an etching solution used for patterning, a wastewater treatment solution including solutions such as a plating solution or an etching solution. Hereinafter, explaining in detail about a measurement method of various metal concentrations relating to one embodiment of the present invention using the drawings, by citing a processing solution for plating as example.

1-1. Calibration Curve Polynomial Determination Step

Explaining from a calibration curve polynomial determination step S11. At first, in order to determine quantity using X-ray fluorescence intensity, it is necessary to calculate approximate curve of polynomials by preparing calibration curves with X-ray intensity and various metal concentrations of the metals to be measured. Concretely, the calibration curve polynomial determination step S11 comprises: preparing three or more types of calibration curve reference solutions, which only contains the metals to be measured and not contains the additives, and in which concentrations of the metals to be measured are changed, and measuring X-ray fluorescence intensity of the calibration curve reference solutions respectively to determine calibration curve intensity A1, A2 . . . , An (wherein, n is an integer of 3 or more); plotting three or more points on a graph by indicating concentrations of the metals to be measured of the calibration curve reference solutions as values of a vertical axis and by indicating the calibration curve intensity A1, A2 . . . , An as values of a horizontal axis; and calculating polynomial approximations from the graph to determine calibration curve polynomial.

Figure 2:
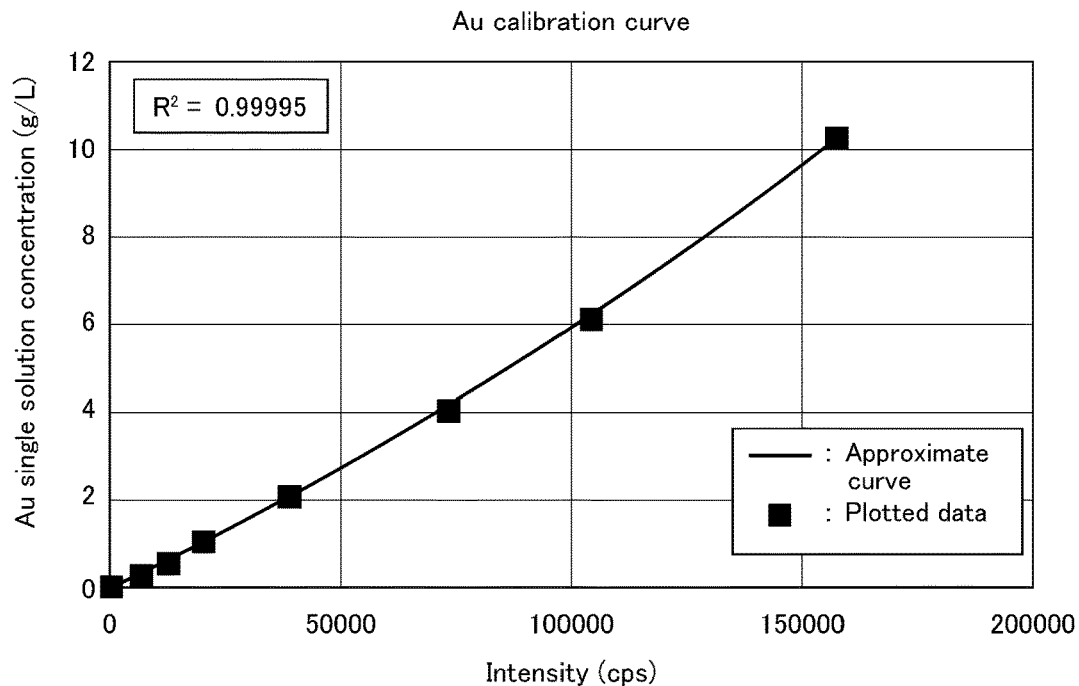
FIG. 2 illustrates calibration curve of Au single solution.

In this way, it is possible to accurately measure various metal concentrations of metals included in a solution to be measured containing a plurality of additives and metals. As an example, a graph of calibration curve of Au single solution not containing additives is illustrated in FIG. 2, and polynomial approximation (calibration curve polynomial) at this time is as follows.
(Calibration curve polynomial)

$$\text{Au concentration (g/L)}=1.07781277*10^{-10}*(\text{X-ray intensity})^2+4.89087647*10^{-5}*(\text{X-ray intensity})-3.31795782*10^{-2} \quad (1)$$

Concentration is calculated by substituting X-ray intensity obtained by measurement into (X-ray intensity) in calibration curve polynomial (1). As illustrated in FIG. 2, when Au is a metal to be measured, calibration curve is prepared by Au single solution. In addition, when Ni (nickel) is a metal to be measured, calibration curve is prepared by Ni single solution. And, polynomial approximation is calculated. In calibration curve, quantitative performance will be better when a value of $R^2$ is near to one. As $R^2$ of calibration curve, it is preferable to adjust degree of polynomial approximation such that it will be 9 until two digits after decimal point, i.e. 0.99 or more. As number of points for plotting data, it is necessary to plot many points for increasing quantitative accuracy, and it is necessary to plot number of points of at least 3 or more. Here, $R^2$ represents correlation coefficient (determination coefficient), and it is a numerical value indicating adaptability with respect to plotted data of approximate curve.

Next, it will be possible to determine quantity if metal to be measured is single metal by using calibration curve, but when other components are included other than a substance to be measured, for example, when it is a processing solution for plating including single or a plurality of additives of organic acid, inorganic acid, inorganic salt or the like, X-ray will be inhibited or absorbed (attenuation of X-ray) by other components, so it is not possible to determine quantity accurately. About details of attenuation of X-ray, it will be described later.

Further, in a processing solution for plating, mixing ratio or types of components of additives contained in a solution differs per solution type, even when a substance to be measured is same, so it is not possible to determine quantity by simple correction. As an example, a graph plotting a relation of X-ray intensity and Au concentrations of two types of Au plating solutions with different component content in a calibration curve graph is illustrated in FIG. 3.

Figure 3:
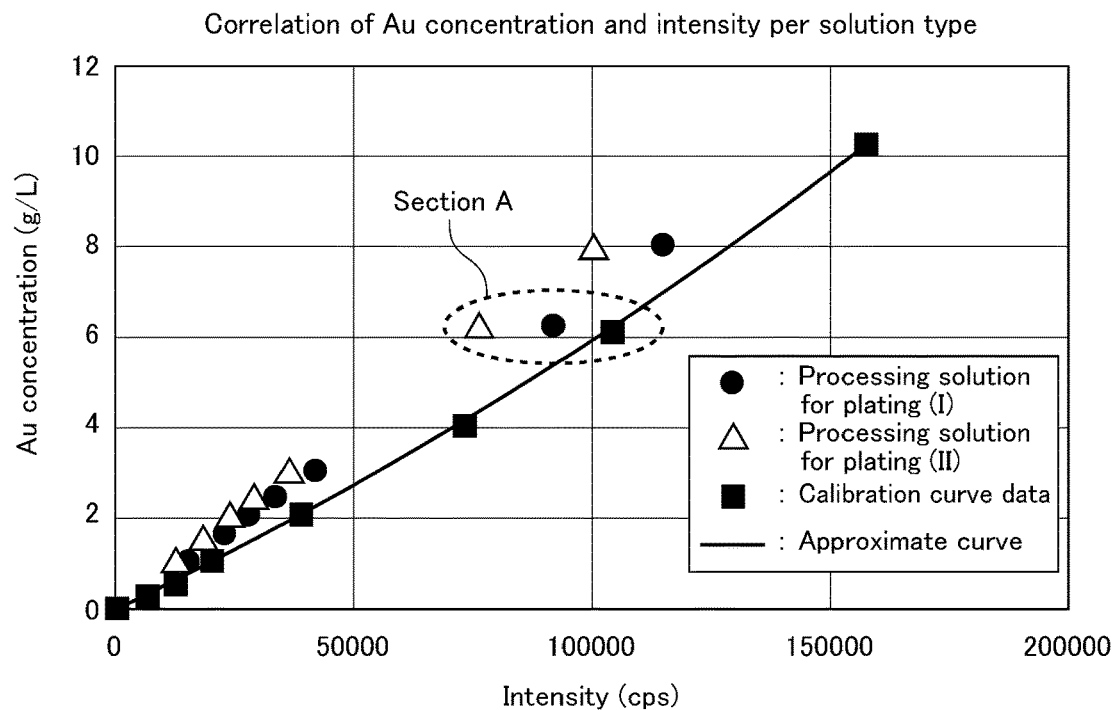
FIG. 3 illustrates correlation of Au concentration and X-ray intensity per solution type.

As illustrated in FIG. 3, a plot illustrated by a broken line circle of section A is plotting three types of solutions (Au single solution, processing solution for plating (I) and processing solution for plating (II): three types) in which contained Au concentration (Au concentration=6 g/L) is in same metal concentration. Comparing with Au single solution, it can be understood that X-ray intensity is decreased in processing solution for plating (I) containing additives by influence of attenuation. Further, in processing solution for plating (II) with different types of additives from processing solution for plating (I), X-ray intensity is more decreased compared with processing solution for plating (I). From the above, it is not possible to correct X-ray intensity with simple correction, so solution type correction coefficient is calculated per solution type.

Figure 4:
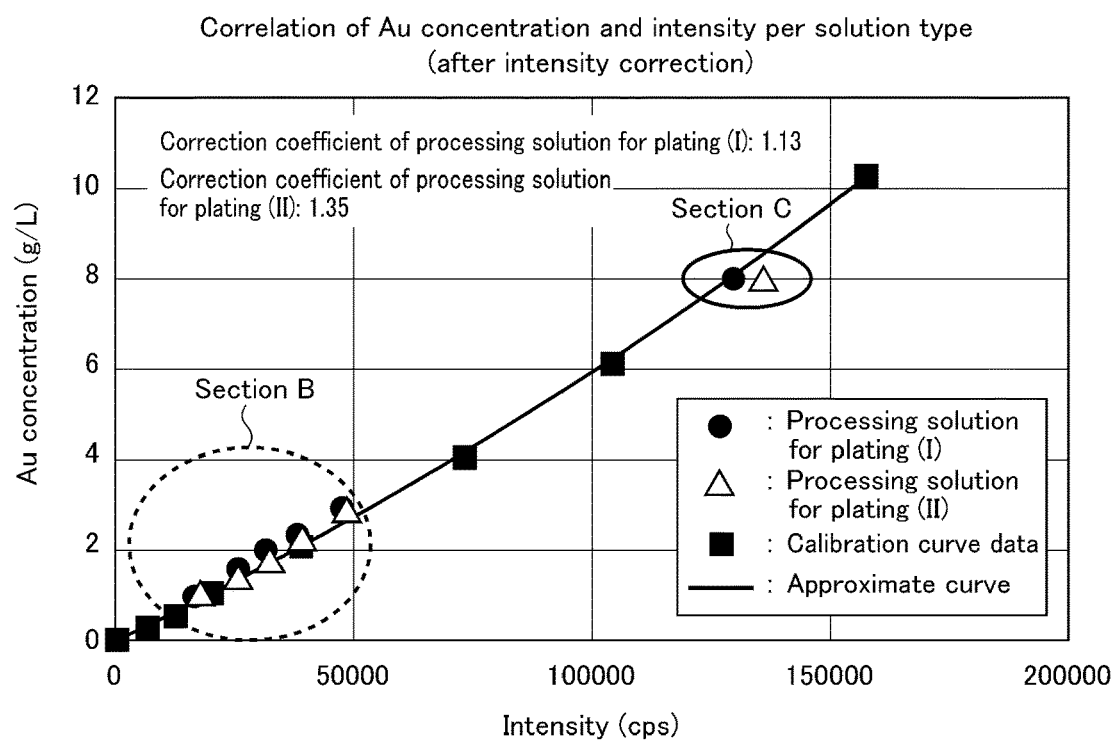
FIG. 4 illustrates correlation of Au concentration and X-ray intensity per solution type after intensity correction.

Next, FIG. 4 illustrates correlation of Au concentration and X-ray intensity per solution type after intensity correction. This is a result of performing correction by calculating solution type correction coefficient by dividing X-ray intensity of a reference solution with Au concentration 6 g/L by X-ray intensity of each processing solution for plating containing additives in Au concentration of 6 g/L. In this way, solution type correction coefficient is calculated, which is a ratio of the measured values of X-ray fluorescence intensity of the reference solution containing only the metal to be measured in which metal concentration is already known and the measured values of X-ray fluorescence intensity of solution for solution type correction added with additives other than the metal to be measured contained in the solution to be measured to the reference solution. In this way, as illustrated in FIG. 4, correction of intensity is performed accurately at X-ray intensity of 6 g/L which was a reference for calculating solution type correction coefficient. In addition, metal concentration and metal substance to be a reference for a reference solution is of course not limited to the above Au 6 g/L.

However, it can be understood that correction of intensity is incomplete, for example in concentrations indicated by a broken line circle of section B or a solid line circle of section C largely deviated from a reference of Au 6 g/L. This is also caused by a characteristic of X-ray. It is possible to calculate correction coefficient easily if concentration of contained substance to be measured does not deviate largely from concentration to be a reference, but when a range of concentration to be a target is wide, it is necessary to calculate correction coefficient by polynomial approximations.

1-2. Solution Type Correction Polynomial Determination Step

Here, in a solution type correction polynomial determination step S12, correction is performed by using approximate curve approximating with polynomial in which the solution type correction coefficient is plotted with respect to X-ray intensity by changing the metal concentrations of the solution type correction solutions and the reference solution. Concretely, the solution type correction polynomial determination step S12 comprises: preparing three or more types of solution type correction reference solutions, in which the additives with same concentration as concentration of the additives contained in the solution to be measured at use are added to the calibration curve reference solutions respectively, and measuring X-ray fluorescence intensity of the solution type correction reference solutions respectively to determine solution type correction intensity B1, B2 . . . , Bn; plotting three or more points on a graph by indicating solution type correction coefficient C1, C2 . . . , Cn, which is a value represented by a formula A1/B1, A2/B2 . . . , An/Bn, as a value of a vertical axis and by indicating the solution type correction intensity B1, B2 . . . , Bn as a horizontal axis; and calculating polynomial approximations from the graph to determine solution type correction polynomial. (Wherein, n is an integer of 3 or more.)

In this way, it is possible to accurately measure various metal concentrations of metals included in a solution to be measured containing a plurality of additives and metals, as accurate correction of intensity will be possible in all ranges of concentration. In addition, it is preferable that concentration of the additives contained in the solution to be measured at use will be optimum concentration when using the solution to be measured, and optimum concentration means concentration preferable according to condition of use. In this way, it is possible to measure more accurately.

Figure 5:
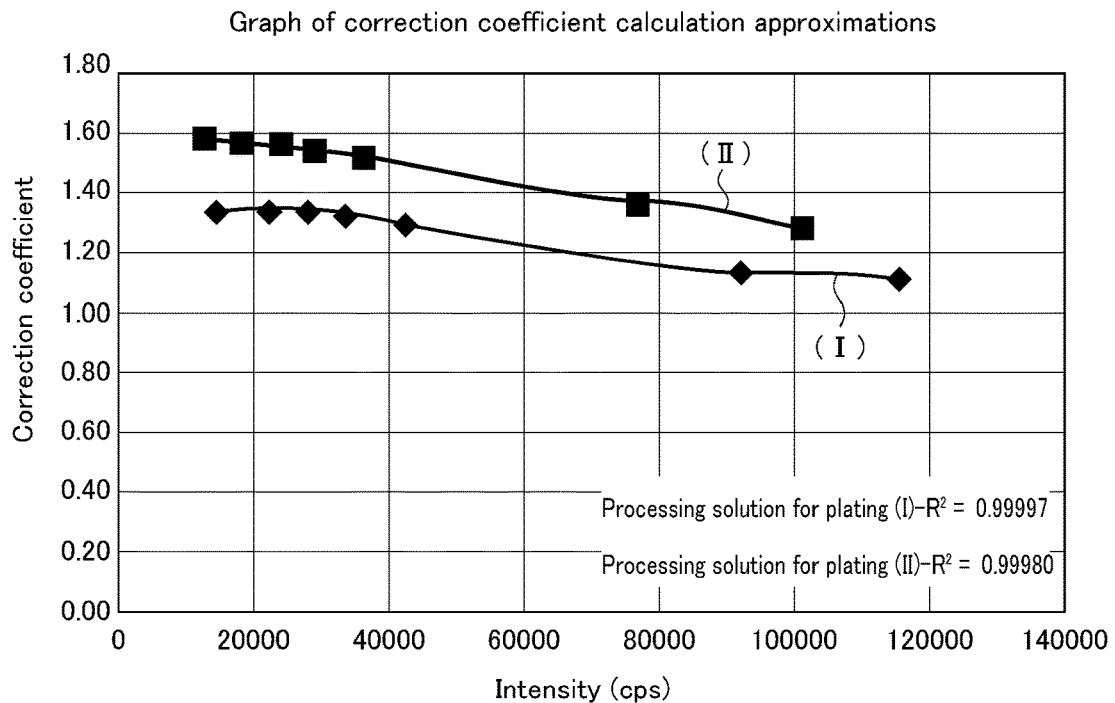
FIG. 5 illustrates a graph of correction coefficient calculation approximations.

As an example, approximations and a graph for deriving polynomial approximations of processing solutions (I) and (II) is illustrated in FIG. 5. As illustrated in FIG. 5, a graph is plotted by indicating solution type correction coefficient C1, C2 . . . , Cn as a vertical axis, and by indicating solution type correction intensity B1, B2 . . . , Bn as a horizontal axis. Polynomials (solution type correction polynomials) of two types of processing solutions for plating illustrated in the graph are as follow.

(Solution Type Correction Polynomial of Processing Solution for Plating (I))

Solution type correction polynomial of processing solution for plating($I$)=−1.176304401*$10^{-20}$*(X-ray intensity)$^4$+3.734773138*$10^{-15}$*(X-ray intensity)$^3$−3.918288266*$10^{-10}$*(X-ray intensity)$^2$+1.269494772*$10^{-5}$*(X-ray intensity)+1.220713864 (2)

(Solution Type Correction Polynomial of Processing Solution for Plating (II))

Solution type correction polynomial of processing solution for plating($II$)=−1.15601383*$10^{-20}$*(X-ray intensity)$^4$+2.833635253*$10^{-15}$*(X-ray intensity)$^3$−2.370999176*$10^{-10}$*(X-ray intensity)$^2$+4.169263348*$10^{-6}$*(X-ray intensity)+1.560132796 (3)

Solution type correction coefficient in each X-ray intensity is calculated by substituting X-ray intensity obtained in following X-ray fluorescence intensity measurement step S22 into the above polynomials (2) and (3). As $R^2$ in polynomial approximations of solution type correction coefficient, it is also preferable to adjust degree of polynomial approximations such that it will be 9 until two digits after decimal point, i.e. 0.99 or more. As number of points for plotting data, it is necessary to plot many points for increasing quantitative accuracy, and it is necessary to plot number of points of at least 3 or more.

Figure 6:
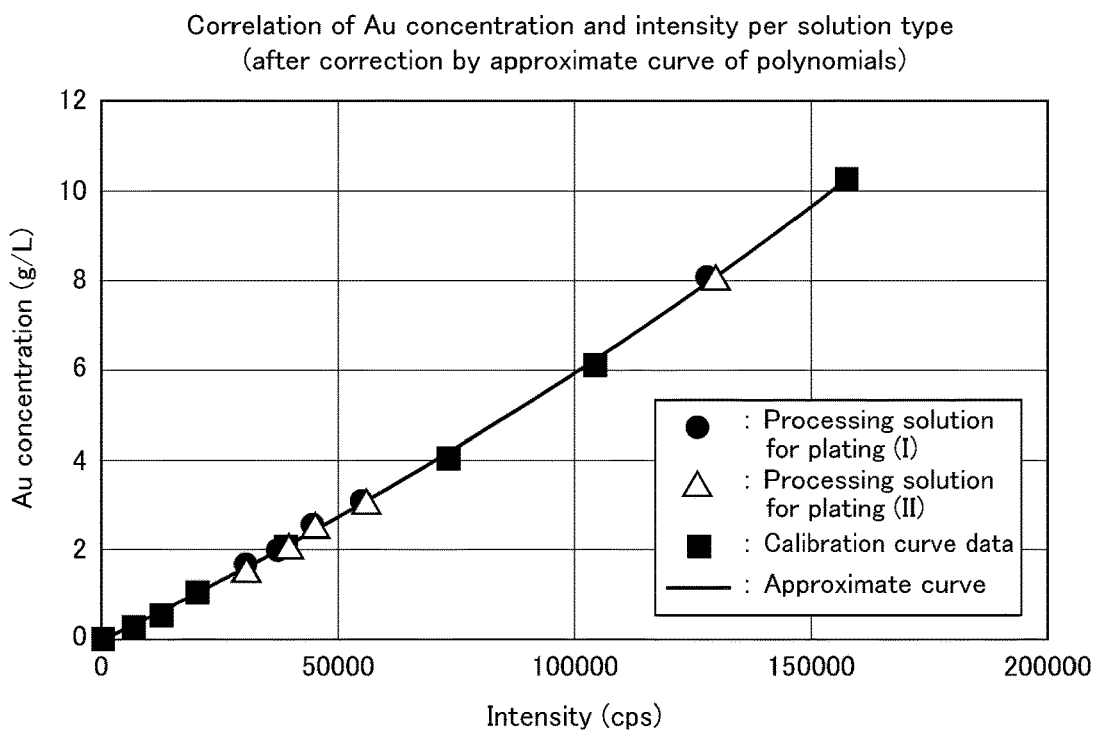
FIG. 6 illustrates correlation of Au concentration and X-ray intensity per solution type after correction by using approximate curve approximating polynomials.

And, FIG. 6 illustrates correlation of Au concentration and X-ray intensity per solution type after correction by using approximate curve approximating polynomials (2) and (3). This is a result of solution type correction by the polynomials (2) and (3) with respect to FIG. 3. As illustrated in FIG. 6, accurate correction of intensity will be possible in all ranges of concentration.

1-3. Specific Gravity Correction Polynomial Determination Step

A measurement method of various metal concentrations relating to one embodiment of the present invention comprises a specific gravity correction polynomial determination step S13 as illustrated in FIG. 1. In the specific gravity correction polynomial determination step S13, polynomial approximations for correcting error in the measured values resulting from differences in specific gravity of the solution to be measured are determined.

In this way, it is possible to accurately measure various metal concentrations of metals included in a solution to be measured containing a plurality of additives and metals, as more accurate measurement of various solutions to be measured, in which specific gravity changes by a difference in concentration of additives, will be possible. It is explained in detail in below.

Figure 7:
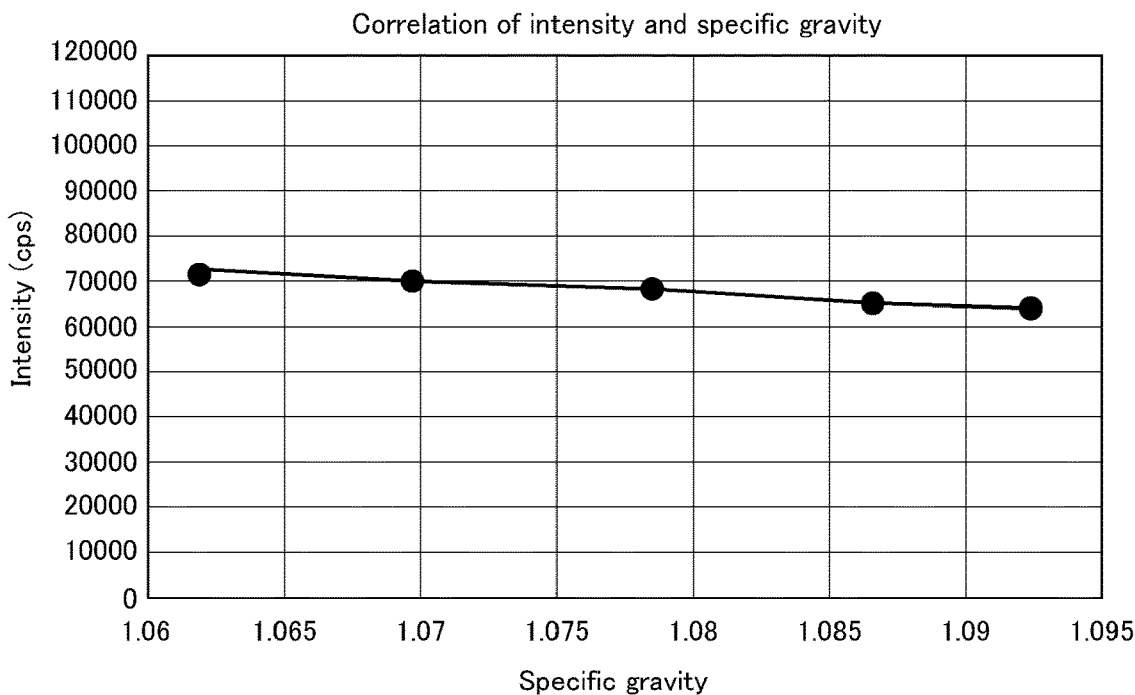
FIG. 7 illustrates correlation of X-ray intensity and specific gravity.

FIG. 7 illustrates correlation of X-ray intensity and specific gravity. As illustrated in FIG. 7, attenuation effect of X-ray depends significantly on types of additives contained in processing solution for plating to be measured, but also depends on content of additives in addition to types. FIG. 7 is a result of confirming correlation of X-ray intensity and specific gravity when only content of additive component is changed while fixing Au content to 5.5 g/L as an example.

In the solution to be measured such as processing solution for plating, even though plural types of additives are contained, mostly mixing ratio of additives are determined in detail, and mostly concentration changes while content ratio is constant, so a change in concentration of additives can be converted into specific gravity easily. FIG. 7 is indicating that correction by specific gravity (change in concentration of additives) is necessary, in order to determine quantity accurately as X-ray intensity changes along with change in specific gravity of the solution to be measured, even when Au content is identical.

By paying attention to correlation of X-ray intensity and specific gravity, quantitative accuracy is more increased by performing correction by specific gravity. Concrete method for determining polynomial approximations is to measure X-ray intensity by changing concentration of additives (specific gravity) variously while fixing content of the substance to be measured.

Explaining in detail about the specific gravity correction polynomial determination step S13. At first, the specific gravity correction polynomial determination step S13 comprises: preparing three or more types of specific gravity correction reference solutions, in which concentrations of the metals to be measured are set to concentrations of the metals included in the solution to be measured at use, and in which concentration of the additives is changed, and measuring X-ray fluorescence intensity of the specific gravity correction reference solutions respectively to determine first specific gravity correction intensity D1, D2 . . . , Dm (wherein, m is an integer of 3 or more), and measuring specific gravity of the specific gravity correction reference solutions respectively to determine reference specific gravity E1, E2 . . . , Em. In addition, it is preferable that concentrations of the metals to be measured will be optimum concentration when using the solution to be measured, and optimum concentration means concentration preferable according to condition of use. In this way, it is possible to measure more accurately. Next, the specific gravity correction polynomial determination step S13 comprises: substituting the first specific gravity correction intensity D1, D2 . . . , Dm into the solution type correction polynomial to obtain the solution type correction coefficient, and multiplying the solution type correction coefficient with the first specific gravity correction intensity D1, D2 . . . , Dm respectively to determine second specific gravity correction intensity F1, F2 . . . , Fm. Next, the specific gravity correction polynomial determination step S13 comprises: measuring X-ray fluorescence intensity of the specific gravity correction reference solutions, among which concentration of the additives is same as concentration of the additives contained in the solution to be measured at use, to determine third specific gravity correction intensity Dp. Next, the specific gravity correction polynomial determination step S13 comprises: substituting the third specific gravity correction intensity Dp into the solution type correction polynomial to obtain the solution type correction coefficient, and multiplying the solution type correction coefficient with the third specific gravity correction intensity Dp to determine fourth specific gravity correction intensity Gp; calculating a value represented by a formula Gp/F1, Gp/F2 . . . , Gp/Fm to determine specific gravity correction coefficient H1, H2 . . . , Hm. Next, the specific gravity correction polynomial determination step S13 comprises: plotting three or more points on a graph by indicating the specific gravity correction coefficient H1, H2 . . . , Hm as values of a vertical axis and by indicating the reference specific gravity E1, E2 . . . , Em as values of a horizontal axis, and calculating polynomial approximations from the graph to determine specific gravity correction polynomial.

In this way, it is possible to accurately measure various metal concentrations of metals included in a solution to be measured containing a plurality of additives and metals, as more accurate measurement of various solutions to be measured, in which specific gravity changes as concentration of the additives differs, will be possible.

Figure 8:
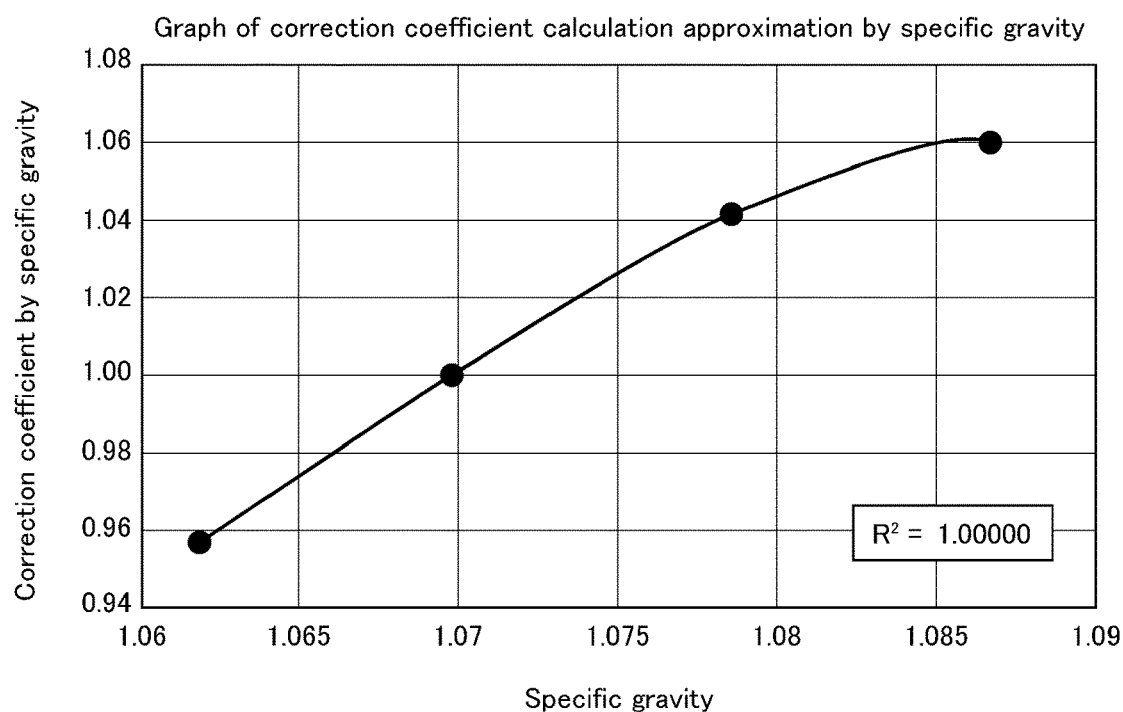
FIG. 8 illustrates a graph of correction coefficient calculation approximation by specific gravity.

FIG. 8 illustrates a graph of correction coefficient calculation approximation by specific gravity, and it is the graph of correction coefficient calculation approximation with respect to processing solution for Au plating of FIG. 7. In addition, polynomial approximation (specific gravity correction polynomial) at this time is indicated in below.

(Specific Gravity Correction Polynomial)

Specific gravity correction polynomial=$-4.13956122*10^3*(\text{specific gravity})^3 + 1.32499699*10^4*(\text{specific gravity}) - 1.41314434*10^4*(\text{specific gravity}) + 5022.89613$ (4)

Specific gravity correction coefficient in each specific gravity is calculated by substituting specific gravity obtained in following specific gravity measurement step S23 into the above polynomial (4). As $R^2$ in polynomial approximation of correction coefficient by specific gravity, it is also preferable to adjust degree of polynomial approximation such that it will be 9 until two digits after decimal point, i.e. 0.99 or more. As number of points for plotted data, it is necessary to plot many points for increasing quantitative accuracy, and it is necessary to plot number of points of at least 3 or more.

Figure 9:
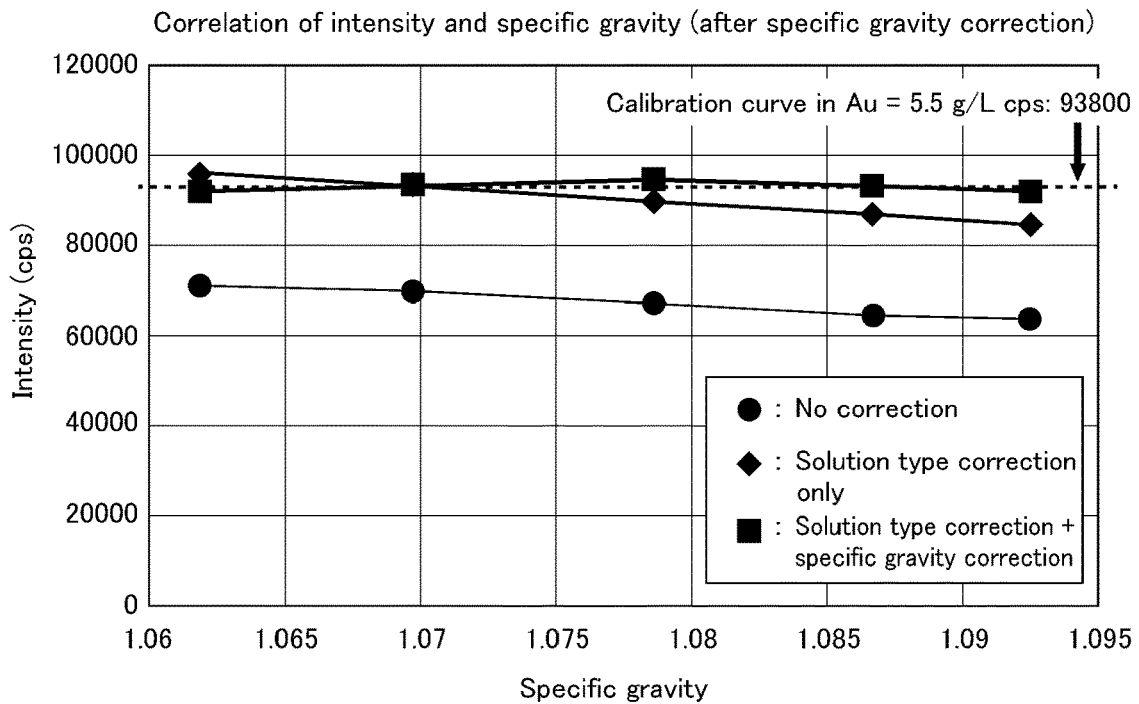
FIG. 9 illustrates correlation of X-ray intensity and specific gravity after specific gravity correction.

A result of performing correction by solution type correction polynomial and specific gravity correction polynomial to data of FIG. 7 is illustrated in FIG. 9. FIG. 9 illustrates correlation of X-ray intensity and specific gravity after specific gravity correction. Correction of intensity is not performed sufficiently only by solution type correction, but by performing specific gravity correction by specific gravity in addition to solution type correction, more accurate measurement of various solutions to be measured, in which specific gravity changes as concentration of the additives differs, will be possible. In the solution to be measured, concentration of components changes every time according to use, so correction by specific gravity will be an important factor for maintaining accuracy of analysis, when continuing to use the solution to be measured such as processing solution for plating for long time.

It is possible to set concentration of various metals included in the solution to be measured to be 50 mg/L or less. Especially, when concentrations of metals contained in a wastewater treatment solution including solutions such as a plating solution, a processing solution for plating or an etching solution is low, it is possible to measure accurately even in a condition of such low concentration.

1-4. Metal Concentration Measurement Step

The metal concentration measurement step S14 is a step for measuring various metal concentrations of the metals to be measured by using the polynomial approximations determined in the calibration curve polynomial determination step S11, the solution type correction polynomial determination step S12, and the specific gravity correction polynomial determination step S13. Hereinafter, explaining in detail about the metal concentration measurement step S14 using FIG. 10.

Figure 10:
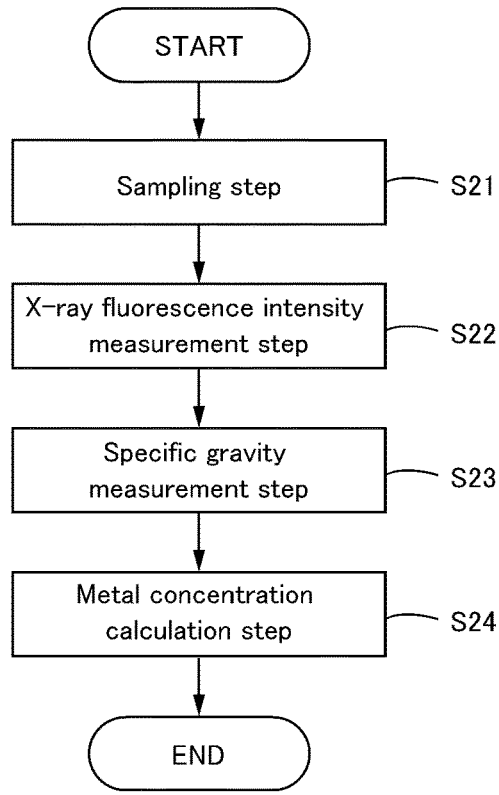
FIG. 10 is a flow chart illustrating an outline of a metal concentration measurement step.

As illustrated in FIG. 10, the metal concentration measurement step S14 comprises; a sampling step S21 for sampling a solution to be measured; an X-ray fluorescence intensity measurement step S22 for measuring X-ray fluorescence intensity of the solution to be measured in which the sampling has been performed; a specific gravity measurement step S23 for measuring specific gravity of the solution to be measured in which the sampling has been performed; and a metal concentration calculation step S24 for calculating concentrations of the metals to be measured using the X-ray fluorescence intensity, the specific gravity, the calibration curve polynomial, the solution type correction polynomial and the specific gravity correction polynomial.

When concretely explaining the metal concentration measurement step S14, at first, the solution to be measured is sampled by the sampling step S21. Next, X-ray fluorescence intensity of the solution to be measured in which the sampling has been performed is measured to determine first measured intensity by the X-ray fluorescence intensity measurement step S22. Next, specific gravity of the solution to be measured in which the sampling has been performed is measured to determine measured specific gravity by the specific gravity measurement step S23.

Next, by the metal concentration calculation step S24, the first measured intensity is substituted into the solution type correction polynomial to obtain the solution type correction coefficient and the solution type correction coefficient is multiplied by the first measured intensity to determine second measured intensity, the measured specific gravity is substituted into the specific gravity correction polynomial to obtain the specific gravity correction coefficient and the specific gravity correction coefficient is multiplied by the second measured intensity to determine third measured intensity, the third measured intensity is substituted into the calibration curve polynomial to calculate concentrations of the metals to be measured, which will be a measurement result of concentrations of the metals to be measured of the solution to be measured. In this way, it is possible to accurately measure various metal concentrations of metals included in a solution to be measured containing a plurality of additives and metals.

1-5. Dilution Step

In addition, before the calibration curve polynomial determination step S11, it may comprise a dilution step S10 for obtaining diluted solution to be measured by diluting the solution to be measured. When it comprises the dilution step S10, various reference solutions used in the calibration curve polynomial determination step S11 and the solution type correction polynomial determination step S12, and the solution to be measured sampled in the sampling step S21 are diluted. In addition, diluted solution is not used, and raw solution is used in the specific gravity correction polynomial determination step S13.

By comprising the dilution step S10, it is possible to accurately measure various metal concentrations of metals included in a solution to be measured, as calculations by polynomial approximations will be facilitated. For example, when there is no dilution step S10, in the solution type correction polynomial determination step S12, polynomial approximation is calculating coefficient by polynomial of fourth degree, but by performing the dilution step S10, polynomial approximation in the solution type correction polynomial determination step S12 can be calculated by polynomial of second degree as below.

Equation=$-2.23810709*10^{-9}$*(X-ray intensity)+ $1.03856703*10^{-5}$*(X-ray intensity)+0.96462610

In addition, in the dilution step S10, it is preferable to dilute concentrations of the metals to be measured to be in a range of 10 to 200 ppm. When concentration is below 10 ppm or over 200 ppm, there is a case that the polynomial approximation cannot be facilitated.

Here, explaining about attenuation of fluorescent X-ray. X-ray hitting an element of the metal to be measured will be reduced as X-ray is absorbed or scattered by elements other than the element of the metal to be measured before X-ray for generating fluorescent X-ray reaches the element of the metal to be measured, or X-ray intensity will be decreased as fluorescent X-ray generated from an element to be measured is absorbed or scattered by elements other than the element of the metal to be measured before fluorescent X-ray reaches a detector. A phenomenon that X-ray fluorescence intensity will not be proportional to concentration of the element is called matrix effect. In addition, attenuation of X-ray depends on concentration of elements other than the element to be measured, as probability of X-ray or fluorescent X-ray hitting elements other than the element to be measured changes by increase or decrease of number of elements other than the element to be measured (increase or decrease of concentration of elements other than the element to be measured).

Thus, according to the measurement method of various metal concentrations relating to one embodiment of the present invention, as it comprises the calibration curve polynomial determination step S11, the solution type correction polynomial determination step S12, the specific gravity correction polynomial determination step S13, and the metal concentration measurement step S14, it is possible to accurately measure various metal concentrations of metals included in a solution to be measured, even when mixing ratio or types of components of additives contained in a solution differs per solution type, or even when concentrations of various metals or additives are changed. Further, it is possible to analyze the solution to be measured having wide range of various meatal concentrations, for example metal concentration from 10 mg/L to 10 g/L. In addition, as it is X-ray fluorescence analysis, different from ICP atomic emission spectroscopy, it is possible to accurately measure various metal concentrations in short time. Thus, for example, by incorporating the measurement method of various metal concentrations relating to one embodiment of the present invention to a device such as following "3. Measurement device of various metal concentrations", timely analysis of the solution to be measured at work sites of plating will be possible. In addition, it is possible to timely replenish the additives used in the solution to be measured such as processing solution for plating, as it is possible to analyze timely.

Therefore, it is possible to inhibit change of various metal concentrations of processing solution for plating or the like to minimum, so control of the solution such as processing solution for plating will be facilitated, and it is possible to inhibit variations in quality of products such as a substance to be plated. Thus, it is advantageous for improving production efficiency and environmentally.

Figure 11:
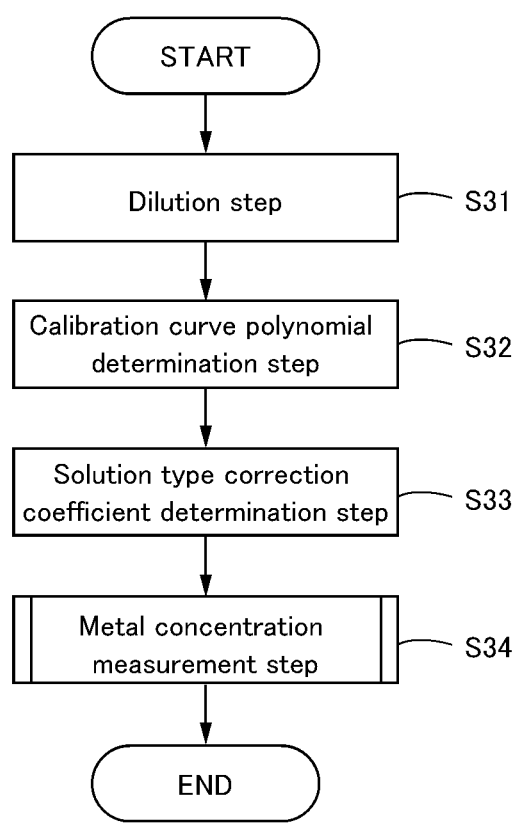
FIG. 11 is a flow chart illustrating an outline of an X-ray fluorescence analysis measurement method relating to another embodiment of the present invention.

2. Measurement Method of Various Metal Concentrations Relating to Another Embodiment Next, explaining about a measurement method of various metal concentrations relating to another embodiment. A measurement method of various metal concentrations relating to another embodiment measures various metal concentrations of metals to be measured included in a solution to be measured containing one or more types of additives and metals based on measured values of X-ray fluorescence intensity. And, as illustrated in FIG. 11, the measurement method comprises: a dilution step S31; a calibration curve polynomial determination step S32; the solution type correction coefficient determination step S33; and the metal concentration measurement step S34.

In the dilution step S31, the solution to be measured is diluted to obtain diluted solution to be measured. In the dilution step S31, it is diluted such that concentration of the metal to be measured will be in a range of 10 to 200 ppm. Here, in the method without dilution as explained in [1. Measurement method of various metal concentrations], X-ray intensity will be decreased by components other than the metal to be measured, so as described in the above, correction is performed by using solution type correction coefficient (correction by types of components other than the metal to be measured) and specific gravity correction coefficient (correction by concentration of components other than the metal to be measured). In addition, both of the correction coefficients are calculated by substituting the measured values into polynomial approximations for calculating correction coefficient previously calculated by using intensity data or specific gravity data obtained by measuring test substance.

Figure 12:
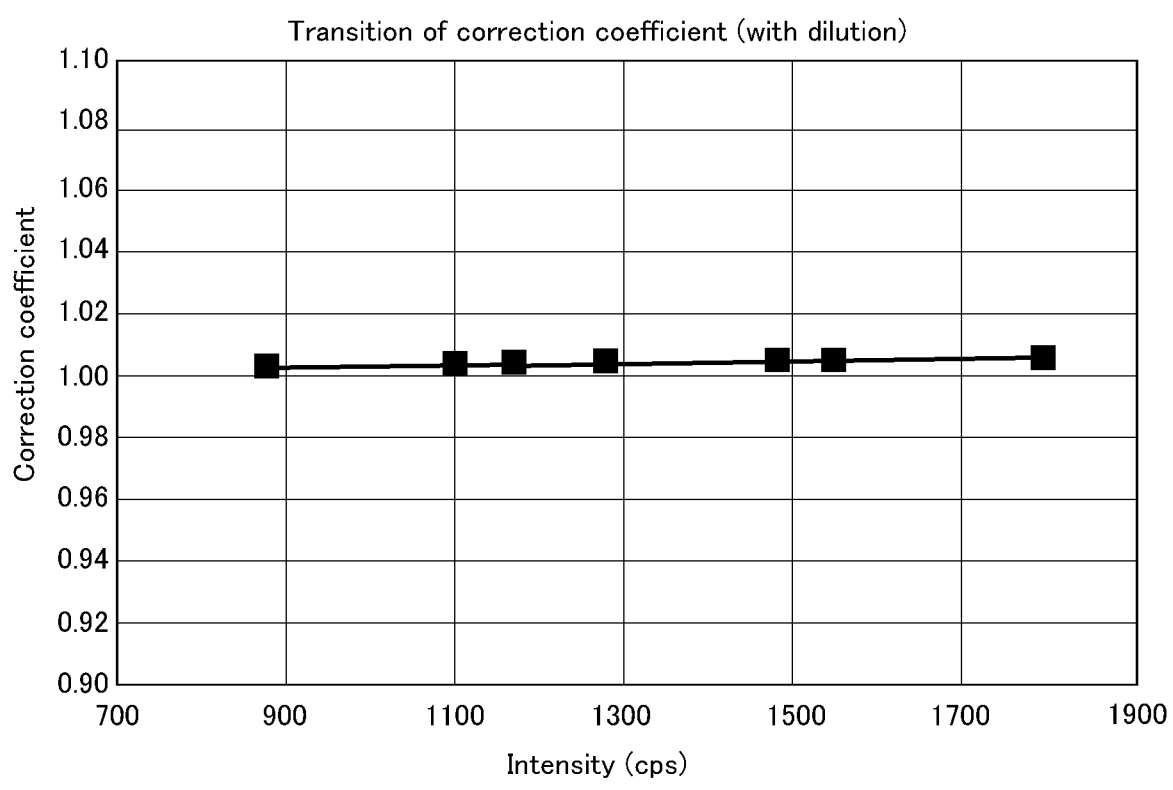
FIG. 12 illustrates transition of correction coefficient when the solution is diluted in an X-ray fluorescence analysis measurement method relating to another embodiment of the present invention.

However, in the measurement method of various metal concentrations relating to another embodiment, various metal concentrations are measured by obtaining diluted solution to be measured by diluting the solution to be measured. When the solution to be measured is diluted as described above, as illustrated in FIG. 12, transition of correction coefficient will be constant with respect to the intensity, so specific gravity correction will be unnecessary as solution type correction coefficient will not be calculated by polynomial approximations and it will be fixed correction coefficient with one point. Calculations by polynomial approximations will be facilitated means such that coefficient is calculated by polynomial of fourth degree at present, but by performing dilution, it can be calculated by polynomial of second degree.

In addition, attenuation of X-ray depends on concentration of elements other than the metal to be measured. The degree of attenuation is represented by following formula theoretically.

$$I = I_0^{-\mu x}$$

($I_0$: number of irradiated photons, I: number of photons after passing through substance, μ: coefficient per substance, x: distance)

μ is coefficient per components other than the metal to be measured, and x is concentration of components other than the metal to be measured or concentration of the metal to be measured.

As illustrated in the formula, effect of attenuation does not increase or decrease linearly proportional to concentration and it increases exponentially. In other words, when dilution is not performed, a value of solution type correction coefficient increases or decreases as it deviates from a value of concentration to be a center, and converges to coefficient of zero degree as it approaches a center value.

On the other hand, when dilution is performed, relatively possible variation of concentration range will be low, so even when it is deviated from a center value, range of solution type correction coefficient will be low and, in optimum case, correction will be completed only by coefficient of zero degree. Thus, it is not necessary to perform correction relating to specific gravity correction coefficient for same reason as solution type correction coefficient.

As a purpose for dilution by standard titration, decreasing amount of titration or enabling analysis by decreasing effect of inhibitory component can be cited, but its purpose differs from purpose for diluting by the measurement method of X-ray fluorescence analysis relating to another embodiment. In addition, the measurement method of X-ray fluorescence analysis relating to embodiment of the present invention is effective to a solution to be measured containing a complexing agent, a reducing agent, a pH buffer, or the like.

In addition, the calibration curve polynomial determination step S32 determines polynomial approximations of calibration curves of the metals to be measured. Its determination method is same as the calibration curve polynomial determination step S11, except that calibration curve reference solutions are diluted. The solution type correction coefficient determination step S33 determines correction coefficient for correcting error in the measured values of X-ray fluorescence intensity of the metals to be measured resulting from containing the additives. Concretely, a step same as the solution type correction polynomial determination step S12 is performed using diluted solution type correction reference solutions to determine polynomial, and solution type correction coefficient is determined by substituting X-ray intensity obtained by following metal concentration measurement step S34 into this polynomial. In addition, by performing dilution of the solution type correction reference solutions, polynomial approximation in the solution type correction coefficient determination step S33 can be calculated by polynomial of second degree, as indicated in the above explanation regarding the dilution step.

And, the metal concentration measurement step S34 measures various metal concentrations of the metals to be measured using polynomial approximations determined by the calibration curve polynomial determination step S32 and correction coefficient determined in the solution type correction coefficient determination step S33. In addition, the metal concentration measurement step S34 is same as the step S14 explained in "1-4. Metal concentration measurement step", except that, in the step S14, it is calculated by substituting the measured values into solution type correction polynomial and specific gravity correction polynomial. In addition, concentration conversion is performed as it is diluted.

3. Measurement Device of Various Metal Concentrations

Figure 13:
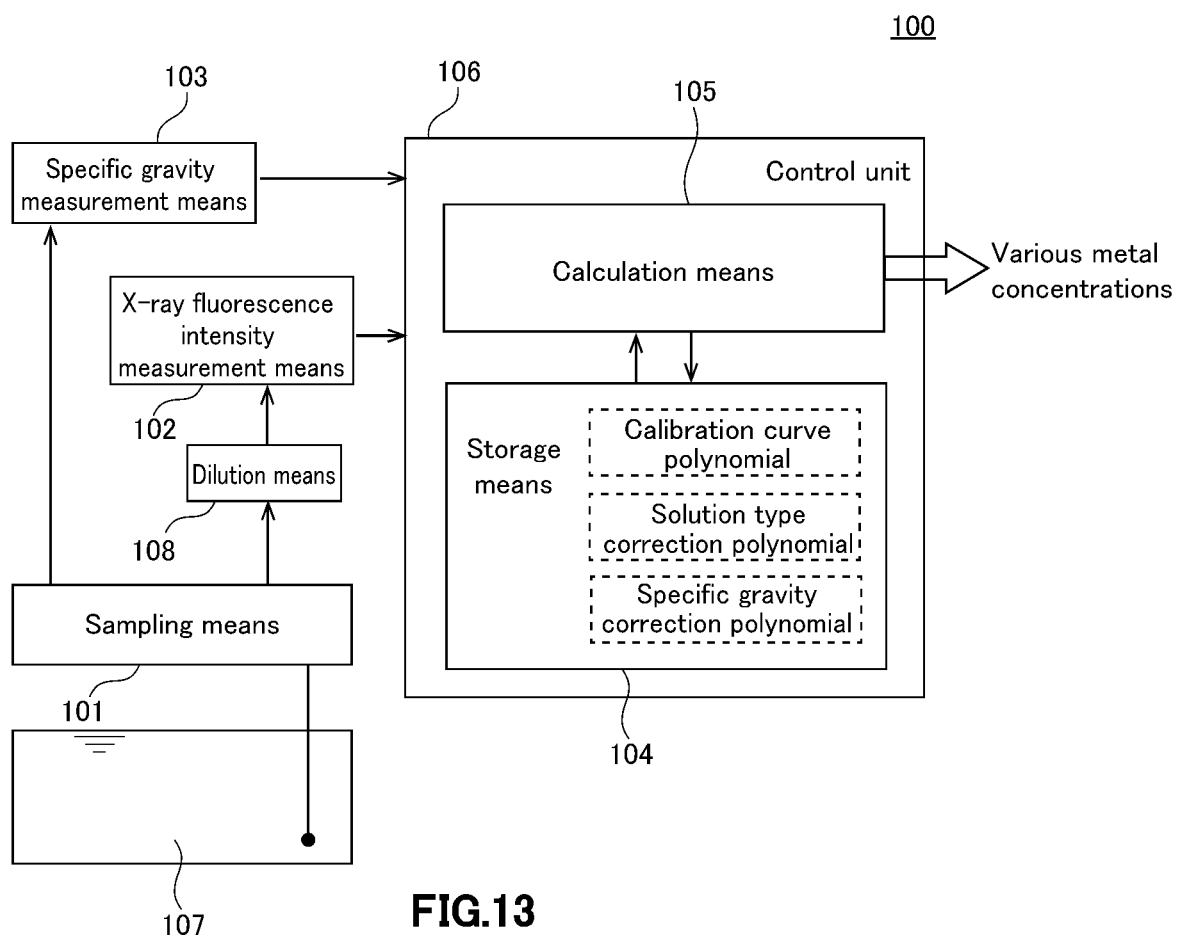
FIG. 13 is a block diagram illustrating an outline of an X-ray fluorescence analysis measurement device relating to one embodiment of the present invention and an X-ray fluorescence analysis measurement device relating to another embodiment of the present invention.

Next, explaining about an X-ray fluorescence analysis measurement device relating to one embodiment of the present invention. FIG. 13 is a block diagram illustrating an outline of an X-ray fluorescence analysis measurement device 100 relating to one embodiment of the present invention. As explained in below, an X-ray fluorescence analysis measurement device 100 relating to one embodiment of the present invention can be provided by incorporating an X-ray fluorescence analysis measurement method relating to one embodiment of the present invention into device.

In other words, as illustrated in FIG. 13, an X-ray fluorescence analysis measurement device 100 relating to one embodiment of the present invention comprises: a sampling means 101 for sampling a solution to be measured; an X-ray fluorescence intensity measurement means 102 for measuring measured values of X-ray fluorescence intensity of the solution to be measured in which the sampling has been performed; a specific gravity measurement means 103 for measuring measured values of specific gravity of the solution to be measured in which the sampling has been performed; a storage means 104 in a control unit 106 such as a computer; and a calculation means 105. The various metal concentrations of the metals included in the solution to be measured is measured by the above means.

3-1. Sampling Means

A sampling means 101 samples a solution to be measured 107 such as processing solution for plating, and feeds the solution to be measured 107 to X-ray fluorescence intensity measurement means 102 and the specific gravity measurement means 103.

3-2. X-Ray Fluorescence Intensity Measurement Means

In an X-ray fluorescence intensity measurement means 102, measured values of the X-ray fluorescence intensity of the solution to be measured 107 received from the sampling means 101 is measured. In the measurement means, X-ray is irradiated on elements in the solution to generate fluorescent X-ray inherent to each element, and X-ray intensity is measured by detecting the generated fluorescent X-ray by a detector. It may be measured by standard condition using a standard X-ray fluorescence spectrometer.

3-3. Specific Gravity Measurement Means

In a specific gravity measurement means 103, measured values of specific gravity of the solution to be measured 107 received from the sampling means 101 is measured. As the measurement means, it may be measured by standard condition using a standard specific gravity measurement device.

3-4. Storage Means

In a storage means 104, a group of polynomials comprising: calibration curve polynomial which is polynomial approximations of calibration curves of the metals to be measured; solution type correction polynomial which is polynomial approximations for correcting error in the measured values of X-ray fluorescence intensity of the metals to be measured resulting from containing additives; and specific gravity correction polynomial which is polynomial approximations for correcting error in the measured values of X-ray fluorescence intensity of the metals to be measured resulting from differences in specific gravity of the solution to be measured, are stored.

A group of polynomials stored in the storage means 104 can be determined by the calibration curve polynomial determination step S11, the solution type correction polynomial determination step S12, and the specific gravity correction polynomial determination step S13.

3-5. Calculation Means

A calculation means 105 calculates the various metal concentrations using the measured values of X-ray fluorescence intensity, the measured values of specific gravity, and the polynomials. As concrete calculation method, it is possible to use the method indicated in the metal concentration measurement step S14. The calculation means 105 performs correction with calculation by a calculator such as an arithmetic unit. For performing the above calculation, it is preferable to control by software (programming).

In addition, it is possible to set concentration of various metals included in the solution to be measured to be 50 mg/L or less, 40 to 50 mg/L, 30 to 40 mg/L, 10 to 30 mg/L, or 1 to 10 mg/L. Especially, when concentrations of metals contained in a wastewater treatment solution including solutions such as a plating solution, a processing solution for plating or an etching solution is low, it is possible to measure accurately even in a condition of such low concentration.

3-6. Dilution Means

Further, as illustrated in FIG. 13, the dilution means 108 for diluting the solution to be measured may be used after the sampling means 101. The dilution means 108 dilutes the solution to be measured sampled by the sampling means 101. The dilution method is as explained in "1-5. Dilution method".

Thus, according to the measurement device of various metal concentrations relating to one embodiment of the present invention, it comprises the X-ray fluorescence intensity measurement means 102, the specific gravity measurement means 103, the storage means 104, and the calculation means 105, so it is possible to accurately measure various metal concentrations, even when mixing ratio or types of components of additives contained in a solution differs per solution type, or even when concentrations of various metals or additives are changed. In addition, it is possible to analyze the solution to be measured having wide range of various metal concentrations, for example, having metal concentration of 10 mg/L to 10 g/L. Further, as it is X-ray fluorescence spectrometer, different from ICP atomic emission spectroscopy, it is possible to accurately measure various metal concentrations in short time. Further, as it can be carried, it can be used in various scenes. Thus, for example, timely analysis of the solution to be measured at work sites of plating will be possible. In addition, it is possible to timely replenish the additives used in the solution to be measured such as processing solution for plating, as it is possible to analyze timely.

Therefore, it is possible to inhibit change of various metal concentrations of processing solution for plating or the like to minimum, so control of the solution such as processing solution for plating will be facilitated, and it is possible to inhibit variations in quality of products such as a substance to be plated. Thus, it is advantageous for improving production efficiency and environmentally.

4. Measurement Device of Various Metal Concentrations Relating to Another Embodiment A measurement device of various metal concentrations relating to another embodiment measures various metal concentrations of metals to be measured included in a solution to be measured containing one or more types of additives and metals based on measured values of X-ray fluorescence intensity. And, as illustrated in FIG. 13, the measurement device of various metal concentrations relating to another embodiment comprises: a dilution means 108 for diluting the solution to be measured; an X-ray fluorescence intensity measurement means 102 for measuring the measured values of X-ray fluorescence intensity; a storage means 104; and a calculation means 105. In addition, descriptions overlapping with "3. Measurement device of various metal concentrations" are omitted.

In the dilution means 108, it is diluted by using water or the like such that concentrations of the metals included in the solution to be measured will be in a range of 10 to 200 ppm.

In the X-ray fluorescence intensity measurement means 102, measured values of the X-ray fluorescence intensity of diluted solution to be measured, which is obtained by diluting the solution to be measured 107 received from the sampling means 101 by the dilution means 108, is measured. In the measurement means, X-ray is irradiated on elements in the solution to generate fluorescent X-ray inherent to each element, and X-ray intensity is measured by detecting the generated fluorescent X-ray by a detector. It may be measured by standard condition using a standard X-ray fluorescence spectrometer.

In the storage means 104, a dilution formula for diluting concentrations of metals included in the solution to be measured to be in a range of 10 to 200 ppm is stored. Thus, the dilution means 108 dilutes concentrations of the metals included in the solution to be measured to be in a range of 10 to 200 ppm by using water or the like, according to calculation by the dilution formula. In addition, in the storage means 104, calibration curve polynomial which is polynomial approximations of calibration curve of the metals to be measured, and correction coefficient for correcting error in the measured values of X-ray fluorescence intensity of the metals to be measured resulting from containing additives, are stored. In other words, specific gravity correction polynomial is not stored in this case. Specific gravity correction will be unnecessary.

The calculation means 105 calculates the various metal concentrations using the measured values of X-ray fluorescence intensity and the correction coefficient. The calculation means 105 performs correction with calculation by a calculator such as an arithmetic unit.

According to the measurement device of various metal concentrations relating to another embodiment, it is possible to accurately measure various metal concentrations of metals included in a solution to be measured easily, as calculations of correction will be facilitated as it will be fixed correction coefficient with one point and solution type correction coefficient will not be calculated by polynomial approximations, and as specific gravity correction will be unnecessary.

EXAMPLES

Next, explaining in detail about an X-ray fluorescence analysis measurement method relating to one embodiment of the present invention by using examples. In addition, the present invention is not limited to these examples.

Example 1

In an example 1, a plating solution containing Au and Co as metals to be measured and a plurality of additives was used as a solution to be measured. In addition, concentrations of metals in the plating solution was measured by ICP (inductively coupled plasma) atomic emission spectroscopy, and its concentrations were Au: 3.21 g/L, Co: 174 mg/L respectively. In X-ray fluorescence analysis, calibration curve polynomial of the plating solution was determined by the calibration curve polynomial determination step S11 using a solution to be measured in which the metal concentration was known, solution type correction polynomial of the plating solution was determined by the solution type correction polynomial determination step S12, specific gravity correction polynomial of the plating solution was determined by the specific gravity correction polynomial determination step S13, and concentrations of metals in the plating solution was measured by the metal concentration measurement step S14.

In detail, in the calibration curve polynomial determination step S11, eight types of calibration curve reference solutions, which contained only Au and Co among components of the plating solution and do not contain other components (additives), and which were having different concentrations of Au and Co respectively, were prepared, and X-ray fluorescence intensity of the solutions were measured respectively to determine calibration curve intensity A1, A2, . . . , A8, and calibration curve polynomial X of the plating solution was determined by applying the calibration curve intensity into the calibration curve polynomial determination step S11.

In addition, in the solution type correction polynomial determination step S12, eight types of solution type correction reference solutions, which contained Au and Co with same concentrations as the eight types of calibration curve reference solutions, and which contained the additives with optimum concentration for using the plating solution, were prepared, and X-ray fluorescence intensity of the solutions were measured respectively to determine solution type correction intensity B1, B2, . . . , B8, and solution type correction polynomial Y of the plating solution was determined by applying the solution type correction intensity into the solution type correction polynomial determination step S12.

Further, in the specific gravity correction polynomial determination step S13, seven types of specific gravity correction reference solutions, in which concentrations of Au and Co were set to optimum concentration when using the plating solution, and in which concentration of the additives were variously changed, were prepared, and X-ray fluorescence intensity of the solutions were measured respectively to determine first specific gravity correction intensity D1, D2, . . . , D8, and specific gravity of the solutions were measured respectively to determine reference specific gravity E1, E2, . . . , E7, and specific gravity correction polynomial Z of the plating solution was determined by applying the first specific gravity correction intensity and the reference specific gravity into the specific gravity correction polynomial determination step S13.

And, in the metal concentration measurement steps S14, the plating solution was sampled (sampling step), X-ray fluorescence intensity of the sampled plating solution was measured to determine first measured intensity (X-ray fluorescence intensity measurement step), specific gravity of the sampled plating solution is measured to determine measured specific gravity (specific gravity measurement step), and concentrations of Au and Co of the plating solution were calculated by applying the first measured intensity, the measured specific gravity, the calibration curve polynomial X, the solution type correction polynomial Y, and the specific gravity correction polynomial Z into the metal concentration calculation step S24. This metal concentration measurement step was performed for ten times. Results of the above steps are indicated in Table 1.

Example 2

In an example 2, concentrations of metals in the plating solution were changed as Au: 4.16 g/L, Co: 157 mg/L. Other measurement method was same as the example 1. Results of the above steps are indicated in Table 2.

Example 3

In an example 3, a plating solution containing Au as metal to be measured and a plurality of additives was used as a solution to be measured. In addition, concentration of metal in the plating solution was measured by ICP (inductively coupled plasma) atomic emission spectroscopy, and its concentration was Au: 3.13 g/L. A solution to be measured in which the metal concentration was known was used, and in the dilution step S31, concentration of the solution to be measured was diluted to be 60 ppm. And, calibration curve polynomial of the plating solution was determined by the calibration curve polynomial determination step S32, the correction coefficient for correcting error of the measured values was determined by the solution type correction coefficient determination step S33, specific gravity correction polynomial determination step was not performed, and concentration of metal in the plating solution was measure for ten times by the metal concentration measurement step S34. Results of the above steps are indicated in Table 3.

Comparative Example 1

In a comparative example 1, with respect to the plating solution of the example 1, X-ray fluorescence analysis measurement method of the present invention was not used, and concentrations of metals were calculated by substituting X-ray fluorescence intensity of the sampled plating solution into the calibration curve polynomial X to be a result of analysis. Results of the above steps are indicated in Table 4.

Comparative Example 2

In a comparative example 2, with respect to the plating solution of the example 2, X-ray fluorescence analysis measurement method of the present invention was not used, and concentrations of metals were calculated by substituting X-ray fluorescence intensity of the sampled plating solution into the calibration curve polynomial of the plating solution to be a result of analysis. Results of the above steps are indicated in Table 5.

Comparative Example 3

In a comparative example 3, with respect to the plating solution of the example 3, X-ray fluorescence analysis measurement method of the present invention was not used, and concentrations of metals were calculated by substituting X-ray fluorescence intensity of the sampled plating solution without dilution into the calibration curve polynomial X of the example 3 to be a result of analysis. Results of the above steps are indicated in Table 6.

TABLE 1

| | | Example 1 | | | |
|---|---|---|---|---|---|
| Solution No. | | Au | | Co | |
| Analysis target | | 3.21 g/L | | 174 mg/L | |
| ICP-quantitative concentration | | Measurement cps | Concentration (g/L) | Measurement cps | Concentration (mg/L) |
| Analysis result | 1 | 39105 | 3.13 | 727 | 172 |
| | 2 | 40132 | 3.22 | 702 | 161 |
| | 3 | 40125 | 3.22 | 746 | 180 |
| | 4 | 40278 | 3.23 | 743 | 179 |
| | 5 | 40153 | 3.22 | 744 | 179 |
| | 6 | 40365 | 3.24 | 723 | 170 |
| | 7 | 40442 | 3.25 | 713 | 166 |
| | 8 | 40259 | 3.23 | 719 | 168 |
| | 9 | 39760 | 3.19 | 742 | 178 |
| | 10 | 40301 | 3.23 | 725 | 171 |
| | Avg. | 40092 | 3.22 | 728 | 172 |
| | Standard deviation | — | 0.03 | — | 6.45 |
| | CV value (%) | — | 1.1 | — | 3.7 |

TABLE 2

| | | Example 2 | | | |
|---|---|---|---|---|---|
| Solution No. | | Au | | Co | |
| Analysis target | | 4.16 g/L | | 157 mg/L | |
| ICP-quantitative concentration | | Measurement cps | Concentration (g/L) | Measurement cps | Concentration (mg/L) |
| Analysis result | 1 | 42828 | 4.02 | 644 | 159 |
| | 2 | 43804 | 4.12 | 650 | 162 |
| | 3 | 43706 | 4.11 | 650 | 162 |
| | 4 | 43841 | 4.12 | 639 | 156 |
| | 5 | 43968 | 4.13 | 637 | 155 |
| | 6 | 43684 | 4.10 | 656 | 165 |
| | 7 | 43850 | 4.12 | 641 | 157 |
| | 8 | 43658 | 4.10 | 653 | 163 |
| | 9 | 43712 | 4.11 | 648 | 161 |
| | 10 | 43701 | 4.11 | 664 | 168 |
| | Avg. | 43675 | 4.10 | 648 | 161 |
| | Standard deviation | — | 0.03 | — | 4.10 |
| | CV value (%) | — | 0.8 | — | 2.6 |

TABLE 3

| | | Example 3 | |
|---|---|---|---|
| Solution No. | | Au | |
| Analysis target | | 3.13 g/L | |
| AAS-quantitative concentration | | Measurement cps | Concentration (g/L) |
| Analysis result | 1 | 1819 | 3.13 |
| | 2 | 1819 | 3.13 |
| | 3 | 1806 | 3.11 |
| | 4 | 1822 | 3.14 |
| | 5 | 1834 | 3.16 |
| | 6 | 1814 | 3.12 |
| | 7 | 1816 | 3.13 |
| | 8 | 1824 | 3.14 |
| | 9 | 1820 | 3.13 |
| | 10 | 1825 | 3.14 |
| | Avg. | 1820 | 3.13 |
| | Standard deviation | — | 0.01 |
| | CV value (%) | 0.4 | |

TABLE 4

| | | Comparative example 1 | | | |
|---|---|---|---|---|---|
| Solution No. | | Au | | Co | |
| Analysis target | | 3.21 g/L | | 174 mg/L | |
| ICP-quantitative concentration | | Measurement cps | Concentration (g/L) | Measurement cps | Concentration (mg/L) |
| Analysis result | 1 | 39105 | 2.66 | 727 | 145 |
| | 2 | 40.132 | 2.74 | 702 | 134 |
| | 3 | 40125 | 2.74 | 746 | 153 |
| | 4 | 40278 | 2.75 | 743 | 151 |
| | 5 | 40153 | 2.74 | 744 | 152 |
| | 6 | 40365 | 2.75 | 723 | 144 |
| | 7 | 40442 | 2.76 | 713 | 140 |
| | 8 | 40259 | 2.75 | 719 | 143 |
| | 9 | 39760 | 2.71 | 742 | 151 |
| | 10 | 40301 | 2.75 | 725 | 145 |

TABLE 4-continued

| | Comparative example 1 | | | |
|---|---|---|---|---|
| Solution No. | Au | | Co | |
| Analysis target | 3.21 g/L | | 174 mg/L | |
| ICP-quantitative concentration | Measurement cps | Concentration (g/L) | Measurement cps | Concentration (mg/L) |
| Avg. | 40092 | 2.74 | 728 | 143 |
| Standard deviation | — | 0.03 | — | 5.45 |
| CV value (%) | — | 1.1 | — | 3.7 |

TABLE 5

| | Comparative example 2 | | | |
|---|---|---|---|---|
| Solution No. | Au | | Co | |
| Analysis target | 4.16 g/L | | 158 mg/L | |
| ICP-quantitative concentration | Measurement cps | Concentration (g/L) | Measurement cps | Concentration (mg/L) |
| Analysis result 1 | 42828 | 2.93 | 644 | 115 |
| 2 | 43804 | 3.00 | 650 | 117 |
| 3 | 43706 | 3.00 | 650 | 118 |
| 4 | 43841 | 3.01 | 639 | 113 |
| 5 | 43968 | 3.02 | 637 | 113 |
| 6 | 43684 | 3.00 | 656 | 120 |
| 7 | 43850 | 3.01 | 641 | 114 |
| 8 | 43658 | 2.99 | 653 | 118 |
| 9 | 43712 | 3.00 | 648 | 117 |
| 10 | 43701 | 3.00 | 664 | 122 |
| Avg. | 43675 | 3.00 | 648 | 117 |
| Standard deviation | — | 0.02 | — | 2.98 |
| CV value (%) | — | 0.8 | — | 2.6 |

TABLE 6

| | Comparative example 3 |  |
|---|---|---|
| Solution No. | Au | |
| Analysis target | 3.13 g/L | |
| AAS-quantitative concentration | Measurement cps | Concentration (g/L) |
| Analysis result 1 | 38130 | 2.59 |
| 2 | 39112 | 2.66 |
| 3 | 39027 | 2.65 |
| 4 | 39079 | 2.66 |
| 5 | 38957 | 2.65 |
| 6 | 39164 | 2.66 |
| 7 | 39239 | 2.67 |
| 8 | 39353 | 2.68 |
| 9 | 38477 | 2.62 |
| 10 | 39492 | 2.69 |
| Avg. | 39003 | 2.65 |
| Standard deviation | — | 0.03 |
| CV value (%) | — | 1.0 |

In the example 1, as illustrated in Table 1, with respect to known Au concentration of 3.21 g/L, average concentration of concentrations calculated from X-ray fluorescence intensity measured for ten times was 3.22 g/L and became almost same value as the known Au concentration, and standard deviation was 0.03 and CV value (standard deviation divided by average) was 1.1, and they were very small values. In addition, with respect to known Co concentration of 174 mg/L, average concentration of concentrations calculated from X-ray fluorescence intensity measured for ten times was 172 mg/L and became almost same value as the known Co concentration, and standard deviation was 6.45 and CV value was 3.7, and they were very small values.

Also, in the example 2, as illustrated in Table 2, with respect to known Au concentration of 4.16 g/L, average concentration of concentrations calculated from X-ray fluorescence intensity measured for ten times was 4.10 g/L and became almost same value as the known Au concentration, and standard deviation was 0.03 and CV value was 0.8, and they were very small values. In addition, with respect to known Co concentration of 157 mg/L, average concentration of concentrations calculated from X-ray fluorescence intensity measured for ten times was 161 mg/L and became almost same value as the known Co concentration, and standard deviation was 4.10 and CV value was 2.6, and they were very small values.

Also, in the example 3, as illustrated in Table 3, with respect to known Au concentration of 3.13 g/L, average concentration of concentrations calculated from X-ray fluorescence intensity measured for ten times was 3.13 g/L and became same value as the known Au concentration, and standard deviation was 0.01 and CV value was 0.4, and they were very small values.

On the other hand, in the comparative example 1, as illustrated in Table 4, regarding Au, standard deviation was 0.03 and CV value was 1.1, and they were very small values as in the example 1, but with respect to known Au concentration of 3.21 g/L, average concentration of concentrations calculated from X-ray fluorescence intensity measured for ten times was 2.74 g/L and resulted in significant measurement error. In addition, also regarding Co, standard deviation was 5.45 and CV value was 3.7, and they were very small values as in the example 1, but with respect to known Co concentration of 174 mg/L, average concentration of concentrations calculated from X-ray fluorescence intensity measured for ten times was 146 mg/L and resulted in significant measurement error. As a result, it showed an importance of the correction.

Also, in the comparative example 2, as illustrated in Table 5, regarding Au, standard deviation was 0.02 and CV value was 0.8, and they were very small values as in the example 2, but with respect to known Au concentration of 4.16 g/L, average concentration of concentrations calculated from X-ray fluorescence intensity measured for ten times was 3.00 g/L and resulted in significant measurement error. In addition, also regarding Co, standard deviation was 2.98 and CV value was 2.6, and they were very small values as in the example 2, but with respect to known Co concentration of 158 mg/L, average concentration of concentrations calculated from X-ray fluorescence intensity measured for ten times was 117 mg/L and resulted in significant measurement error. As a result, also in the comparative example 2, it showed an importance of the correction.

Also, in the comparative example 3, as illustrated in Table 6, standard deviation was 0.03 and CV value was 1.0, and they were very small values as in the example 3, but with respect to known Au concentration of 3.13 g/L, average concentration of concentrations calculated from X-ray fluorescence intensity measured for ten times was 2.65 g/L and resulted in significant measurement error. As a result, in the comparative example 3, it showed an importance of an effect of the dilution.

As described in the above, in the examples, various metal concentrations of the metals to be measured included in the solution to be measured was measured accurately repeatedly. In other words, calibration curve can be prepared accurately by the X-ray fluorescence analysis measurement method relating to one embodiment of the present invention and corrected accurately, and it is possible to accurately measure various metal concentrations, even when mixing ratio or types of components of additives contained in a solution differs per solution type, or even when concentrations of various metals or additives are changed, without being influenced by the plurality of additives contained in the plating solution.

In addition, it is explained in detail about each embodiment and each example of the present invention as the above, but it can be understood easily for those who skilled in the art that various modifications can be made without practically departing from new matters and effect of the present invention. Therefore, all such variants should be included in the scope of the present invention.

For example, terms described with different terms having broader or equivalent meaning at least once in description and drawings can be replaced with these different terms in any part of description and drawings. In addition, operation and configuration of the X-ray fluorescence analysis measurement method and the X-ray fluorescence analysis measurement device are not limited to those explained in each embodiment and each example of the present invention, and various modifications can be made.

GLOSSARY OF DRAWING REFERENCES

S10 Dilution step
S11 Calibration curve polynomial determination step
S12 Solution type correction polynomial determination step
S13 Specific gravity correction polynomial determination step
S14 Metal concentration measurement step
S21 Sampling step
S22 X-ray fluorescence intensity measurement step
S23 Specific gravity measurement step
S24 Metal concentration calculation step
S31 Dilution step
S32 Calibration curve polynomial determination step
S33 Solution type correction coefficient determination step
S34 Metal concentration measurement step
100 X-ray fluorescence analysis measurement device
101 Sampling means
102 X-ray fluorescence intensity measurement means
103 Specific gravity measurement means
104 Storage means
105 Calculation means
106 Control unit
107 Solution to be measured
108 Dilution means

The invention claimed is:

1. An X-ray fluorescence analysis measurement method for measuring various metal concentrations of metals to be measured included in a solution to be measured containing one or more types of additives and metals based on measured values of X-ray fluorescence intensity, comprising:
a calibration curve polynomial determination step for determining polynomial approximations of calibration curves for the metals to be measured;
a solution type correction polynomial determination step for determining polynomial approximations for correcting error in the measured values of X-ray fluorescence intensity of the metals to be measured resulting from containing additives;
a specific gravity correction polynomial determination step for determining polynomial approximations for correcting error in the measured values of X-ray fluorescence intensity of the metals to be measured resulting from differences in specific gravity of the solution to be measured; and
a metal concentration measurement step for measuring various metal concentrations of the metals to be measured by using the polynomial approximations determined in the calibration curve polynomial determination step, the solution type correction polynomial determination step, and the specific gravity correction polynomial determination step.

2. The X-ray fluorescence analysis measurement method according to claim 1, wherein the calibration curve polynomial determination step comprises:
preparing three or more types of calibration curve reference solutions, which only contain the metals to be measured and not contain the additives, and in which concentrations of the metals to be measured are changed, and measuring X-ray fluorescence intensity of the calibration curve reference solutions respectively to determine calibration curve intensity $A1, A2 \ldots, An$;
plotting three or more points on a graph by indicating concentrations of the metals to be measured of the calibration curve reference solutions as values of a vertical axis and by indicating the calibration curve intensity $A1, A2 \ldots, An$ as values of a horizontal axis; and
calculating polynomial approximations from the graph to determine calibration curve polynomial (wherein, n is an integer of 3 or more).

3. The X-ray fluorescence analysis measurement method according to claim 2, wherein the solution type correction polynomial determination step comprises:
preparing three or more types of solution type correction reference solutions, in which the additives with same concentration as concentration of the additives contained in the solution to be measured at use are added to the calibration curve reference solutions respectively, and measuring X-ray fluorescence intensity of the solution type correction reference solutions respectively to determine solution type correction intensity $B1, B2 \ldots, Bn$;
plotting three or more points on a graph by indicating solution type correction coefficient $C1, C2 \ldots, Cn$, which is a value represented by a formula $A1/B1$, $A2/B2 \ldots, An/Bn$, as a value of a vertical axis and by indicating the solution type correction intensity $B1, B2 \ldots, Bn$ as a horizontal axis; and
calculating polynomial approximations from the graph to determine solution type correction polynomial (wherein, n is an integer of 3 or more).

4. The X-ray fluorescence analysis measurement method according to claim 3, wherein the specific gravity correction polynomial determination step comprises:
preparing three or more types of specific gravity correction reference solutions, in which concentrations of the metals to be measured are set to concentrations of the metals included in the solution to be measured at use, and in which concentration of the additives is changed, and measuring X-ray fluorescence intensity of the specific gravity correction reference solutions respectively to determine first specific gravity correction intensity D1, D2 . . . , Dm, and measuring specific gravity of the specific gravity correction reference solutions respectively to determine reference specific gravity E1, E2 . . . , Em;

substituting the first specific gravity correction intensity D1, D2 . . . , Dm into the solution type correction polynomial to obtain the solution type correction coefficient, and multiplying the solution type correction coefficient with the first specific gravity correction intensity D1, D2 . . . , Dm respectively to determine second specific gravity correction intensity F1, F2 . . . , Fm;

measuring X-ray fluorescence intensity of the specific gravity correction reference solutions, among which concentration of the additives is same as concentration of the additives contained in the solution to be measured at use, to determine third specific gravity correction intensity Dp;

substituting the third specific gravity correction intensity Dp into the solution type correction polynomial to obtain the solution type correction coefficient, and multiplying the solution type correction coefficient with the third specific gravity correction intensity Dp to determine fourth specific gravity correction intensity Gp;

calculating a value represented by a formula Gp/F1, Gp/F2 . . . , Gp/Fm to determine specific gravity correction coefficient H1, H2 . . . , Hm;

plotting three or more points on a graph by indicating the specific gravity correction coefficient H1, H2 . . . , Hm as values of a vertical axis and by indicating the reference specific gravity E1, E2 . . . , Em as values of a horizontal axis, and calculating polynomial approximations from the graph to determine specific gravity correction polynomial (wherein, m is an integer of 3 or more).

5. The X-ray fluorescence analysis measurement method according to claim 4, wherein the metal concentration measurement step comprises:

an X-ray fluorescence intensity measurement step for measuring X-ray fluorescence intensity of the solution to be measured to determine first measured intensity;

a specific gravity measurement step for measuring specific gravity of the solution to be measured to determine measured specific gravity; and a metal concentration calculation step for calculating concentrations of the metals to be measured using the X-ray fluorescence intensity, the specific gravity, the calibration curve polynomial, the solution type correction polynomial and the specific gravity correction polynomial, wherein, in the metal concentration calculation step, the first measured intensity is substituted into the solution type correction polynomial to obtain the solution type correction coefficient and the solution type correction coefficient is multiplied by the first measured intensity to determine second measured intensity, the measured specific gravity is substituted into the specific gravity correction polynomial to obtain the specific gravity correction coefficient and the specific gravity correction coefficient is multiplied by the second measured intensity to determine third measured intensity, the third measured intensity is substituted into the calibration curve polynomial to calculate concentrations of the metals to be measured, which will be a measurement result of concentrations of the metals to be measured of the solution to be measured.

6. The X-ray fluorescence analysis measurement method according to claim 1, further comprising a dilution step for obtaining diluted solution to be measured by diluting the solution to be measured before the calibration curve polynomial determination step, wherein at least the solution type correction polynomial determination step is performed using the diluted solution to be measured.

7. An X-ray fluorescence analysis measurement method for measuring various metal concentrations of metals to be measured included in a solution to be measured containing one or more types of additives and metals based on measured values of X-ray fluorescence intensity, comprising:

a dilution step for obtaining diluted solution to be measured by diluting the solution to be measured;

a calibration curve polynomial determination step for determining polynomial approximations of calibration curves for the metals to be measured;

a solution type correction coefficient determination step for determining correction coefficient for correcting error in the measured values of X-ray fluorescence intensity of the metals to be measured resulting from containing additives;

a metal concentration measurement step for measuring various metal concentrations of the metals to be measured by using the polynomial approximations determined in the calibration curve polynomial determination step and the correction coefficient determined in the solution type correction coefficient determination step, wherein, in the dilution step, concentrations of the metals to be measured are diluted to be in a range of 10 to 200 ppm.

8. An X-ray fluorescence analysis measurement device for measuring various metal concentrations of metals to be measured included in a solution to be measured containing one or more types of additives and metals based on measured values of X-ray fluorescence intensity, comprising:

an X-ray fluorescence intensity measurement means for measuring the measured values of X-ray fluorescence intensity;

a specific gravity measurement means for measuring measured values of specific gravity of the solution to be measured;

a storage means; and a calculation means, wherein the storage means stores a group of polynomials including:

calibration curve polynomial which is polynomial approximations of calibration curves of the metals to be measured;

solution type correction polynomial which is polynomial approximations for correcting error in the measured values of X-ray fluorescence intensity of the metals to be measured resulting from containing additives; and specific gravity correction polynomial which is polynomial approximations for correcting error in the measured values of X-ray fluorescence intensity of the metals to be measured resulting from differences in specific gravity of the solution to be measured, wherein the calculation means calculates the various metal concentrations using the measured values of X-ray fluorescence intensity, the measured values of specific gravity and the group of polynomials.

9. An X-ray fluorescence analysis measurement device for measuring various metal concentrations of metals to be measured included in a solution to be measured containing one or more types of additives and metals based on measured values of X-ray fluorescence intensity, comprising:
- a dilution means for diluting the solution to be measured;
- an X-ray fluorescence intensity measurement means for measuring the measured values of X-ray fluorescence intensity;
- a storage means; and
- a calculation means, wherein the storage means stores:
- a dilution formula for diluting concentrations of metals included in the solution to be measured to be in a range of 10 to 200 ppm;
- calibration curve polynomial which is polynomial approximations of calibration curves of the metals to be measured; and
- correction coefficient for correcting error in the measured values of X-ray fluorescence intensity of the metals to be measured resulting from containing additives, wherein the calculation means calculates the various metal concentrations using the measured values of X-ray fluorescence intensity and the correction coefficient.

* * * * *